US006593939B2

(12) United States Patent
Yamada et al.

(10) Patent No.: US 6,593,939 B2
(45) Date of Patent: Jul. 15, 2003

(54) IMAGE DISPLAY DEVICE AND DRIVER CIRCUIT THEREFOR

(75) Inventors: Yukimitsu Yamada, Miyagi-ken (JP); Ken Kawahata, Miyagi-ken (JP); Hiroyuki Hebiguchi, Miyagi-ken (JP); Tatsumi Fujiyoshi, Miyagi-ken (JP); Junichi Saito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/966,628

(22) Filed: Sep. 28, 2001

(65) Prior Publication Data

US 2002/0012006 A1 Jan. 31, 2002

Related U.S. Application Data

(63) Continuation of application No. 09/286,864, filed on Apr. 6, 1999.

(51) Int. Cl.$^{7}$ ............................ H04N 7/01; G07G 3/36

(52) U.S. Cl. ....................... 345/660; 345/671; 345/534; 345/543; 345/546; 345/547; 345/549; 348/458; 348/459; 348/913; 348/558

(58) Field of Search ......................... 345/660, 670–671, 345/545–549, 536–538, 543, 815, 531, 535; 711/151, 158; 348/445, 441, 458–459, 913, 747, 911, 469, 426.1, 588, 472, 558, 555, 556, 553, 554, 534, 535, 543

(56) References Cited

U.S. PATENT DOCUMENTS

| | | | | | |
|---|---|---|---|---|---|
| 5,168,270 | A | * | 12/1992 | Masumori et al. | 345/100 |
| 5,192,945 | A | * | 3/1993 | Kusada | 345/88 |
| 5,600,347 | A | | 2/1997 | Thompson et al. | |
| 5,808,596 | A | | 9/1998 | Kim | |
| 5,818,416 | A | | 10/1998 | Hwang | |
| 6,061,103 | A | * | 5/2000 | Okamura et al. | 348/767 |
| 6,067,071 | A | | 5/2000 | Kotha et al. | |
| 6,075,513 | A | * | 6/2000 | Reddy et al. | 345/589 |
| 6,118,429 | A | | 9/2000 | Kasai et al. | |
| 6,124,842 | A | | 9/2000 | Mizutome et al. | |
| 6,181,317 | B1 | | 1/2001 | Taguchi et al. | |
| 6,188,382 | B1 | | 2/2001 | Okamura et al. | |
| 6,191,772 | B1 | * | 2/2001 | Mical et al. | 345/698 |
| 6,198,467 | B1 | | 3/2001 | Chiang | |
| 6,331,862 | B1 | * | 12/2001 | Yamada et al. | 345/660 |
| 6,366,289 | B1 | * | 4/2002 | Johns | 345/543 |
| 6,384,867 | B1 | * | 5/2002 | Seino et al. | 348/558 |

FOREIGN PATENT DOCUMENTS

| | | | | |
|---|---|---|---|---|
| DE | 44 12 429 A1 | | 10/1994 | |
| JP | 1998-308591 | * | 4/1998 | H04N/5/46 |
| JP | 411133880 A | * | 5/1999 | G09F/9/00 |

OTHER PUBLICATIONS

Kasai et al., *Late–News Paper*: Development of 13.3–in. Super TFT–LCD Monitor, Sid International Symposium, Digest of Technical Papers, 1996, 414–417.

* cited by examiner

*Primary Examiner*—Matthew C. Bella
*Assistant Examiner*—Wesner Sajous
(74) *Attorney, Agent, or Firm*—Brinks Hofer Gilson & Lione

(57) ABSTRACT

An image display device includes a display panel having predetermined numbers of pixels defined in horizontal and vertical directions, respectively, and an interpolated-data generation circuit whereby an expanded image data is produced in such a manner that when the number of pixels in the horizontal direction of the display panel is greater than the number of pixels in the horizontal direction of a given image signal, the interpolated-data generation circuit directly stores a plurality of image data A, B, C, D, E of the original image signal along one horizontal line at data storage locations closest to the original locations, and data at data storage locations remaining after storing all original data are given the results X, Y, and Z obtained by calculation from two original image data at locations adjacent to the respective remaining data storage locations thereby expanding the original image signal to have a resolution well matched to the resolution of the display panel without causing a reduction in contrast.

22 Claims, 28 Drawing Sheets

FIG. 28

| NUMBER OF PXELS OF IMAGE DATA | DISPLY DEVICE SIZE 352 | 640 | 704 | 720 | 800 | 832 | 854 |
|---|---|---|---|---|---|---|---|
| 352 | 1 | 1.818182 | 2 | 2.045455 | 2.272727 | 2.363636 | 2.426136 |
| 640 | 0.55 | 1 | 1.1 | 1.125 | 1.25 | 1.3 | 1.334375 |
| 704 | 0.5 | 0.90909 | 1 | 1.022727 | 1.136364 | 1.181818 | 1.213068 |
| 720 | 0.48889 | 0.88889 | 0.97778 | 1 | 1.111111 | 1.155556 | 1.186111 |
| 800 | 0.44 | 0.8 | 0.88 | 0.9 | 1 | 1.04 | 1.0675 |
| 832 | 0.42308 | 0.76923 | 0.84615 | 0.86538 | 0.96154 | 1 | 1.026442 |
| 854 | 0.41218 | 0.74941 | 0.82436 | 0.84309 | 0.93677 | 0.97424 | 1 |
| 944 | 0.37288 | 0.67797 | 0.74576 | 0.76271 | 0.84746 | 0.88136 | 0.90466 |
| 1024 | 0.34375 | 0.625 | 0.6875 | 0.70313 | 0.78125 | 0.8125 | 0.83398 |
| 1152 | 0.30556 | 0.55556 | 0.61111 | 0.625 | 0.69444 | 0.72222 | 0.74132 |
| 1280 | 0.275 | 0.5 | 0.55 | 0.5625 | 0.625 | 0.65 | 0.66719 |
| 1600 | 0.22 | 0.4 | 0.44 | 0.45 | 0.5 | 0.52 | 0.53375 |
| 1920 | 0.18333 | 0.33333 | 0.36667 | 0.375 | 0.41667 | 0.43333 | 0.44479 |

FIG. 29

| NUMBER OF PXELS OF IMAGE DATA | DISPLY DEVICE SIZE 944 | 1024 | 1152 | 1280 | 1600 | 1920 |
|---|---|---|---|---|---|---|
| 352 | 2.681818 | 2.909091 | 3.272727 | 3.636364 | 4.545455 | 5.454545 |
| 640 | 1.475 | 1.6 | 1.8 | 2 | 2.5 | 3 |
| 704 | 1.340909 | 1.454545 | 1.636364 | 1.818182 | 2.272727 | 2.727273 |
| 720 | 1.311111 | 1.422222 | 1.6 | 1.777778 | 2.222222 | 2.666667 |
| 800 | 1.18 | 1.28 | 1.44 | 1.6 | 2 | 2.4 |
| 832 | 1.134615 | 1.230769 | 1.384615 | 1.538462 | 1.923077 | 2.307692 |
| 854 | 1.105386 | 1.199063 | 1.348946 | 1.498829 | 1.873536 | 2.248244 |
| 944 | 1 | 1.084746 | 1.220339 | 1.355932 | 1.694915 | 2.033898 |
| 1024 | 0.92188 | 1 | 1.125 | 1.25 | 1.5625 | 1.875 |
| 1152 | 0.81944 | 0.88889 | 1 | 1.111111 | 1.388889 | 1.666667 |
| 1280 | 0.7375 | 0.8 | 0.9 | 1 | 1.25 | 1.5 |
| 1600 | 0.59 | 0.64 | 0.72 | 0.8 | 1 | 1.2 |
| 1920 | 0.49167 | 0.53333 | 0.6 | 0.66667 | 0.83333 | 1 |

IMAGE DISPLAY DEVICE AND DRIVER CIRCUIT THEREFOR

This application is a continuation of application Ser. No. 09/286/864, filed Apr. 6, 1999, (pending), which is hereby incorporated by reference herein.

BACKGROUND OF THE INVENTION

1. Field of the Invention

The present invention relates to an image display device, and more particularly, to an image display device capable of displaying an expanded image signal when an image signal input to the device has a smaller number of pixels than the number of pixels of a display panel.

The present invention also relates to a driver circuit for use in a display device with a high-resolution display panel in which the resolution is switched during an operation.

2. Description of the Related Art

In image display devices for use in personal computers or the like, the number of pixels of a display panel is defined in various standards. Widely used standards include VGA, SGVA, XGA, SXGA, and UXGA. In these standards, the number of pixels per frame is defined as follows.

VGA: 640 pixels in the horizontal direction and 480 pixels in the vertical direction;

SVGA: 800 pixels in the horizontal direction and 600 pixels in the vertical direction;

XGA: 1024 pixels in the horizontal direction and 768 pixels in the vertical direction;

SXGA: 1280 pixels in the horizontal direction and 1024 pixels in the vertical direction; and UXGA: 1600 pixels in the horizontal direction and 1200 pixels in the vertical direction.

(In the above description, VGA, SVGA, XGA, SXGA, and UXGA are all registered trademarks of IBM Corp.)

In some cases, it is required to display an image signal on a display device according to a standard which is different from that of the image signal such as when a VGA image signal is displayed on an XGA display panel. In such a case, it is required to expand a VGA image signal to a size corresponding to the size of the XGA high-resolution display panel.

Two conventional signal expansion techniques are known in the art of the image display device as described below.

A first technique is, as shown in FIG. 8, to switch the sampling frequency at which an analog-to-digital converter 101 converts an analog signal to a digital signal.

For example, when an analog signal such as that shown on the top of FIG. 9 is given, if the analog signal is sampled in response to a clock signal 1 at a fixed frequency, then digital data 1 is obtained as denoted by A, B, C, D, E, F, G, . . . . If the same analog signal is sampled in response to a clock signal 2 at a higher frequency, then different digital data 2 is obtained as denoted by h, i, j, k, l, m, n, o, p, q, r, . . . The latter digital data 2 includes an increased number of data compared to the digital data 1 obtained using the clock 1. This means that the image signal is expanded.

The second technique is to detect the resolution of a given image signal and to set the expansion ratio to a value corresponding to the ratio of the resolution of the display panel to that of the given image. Each frame of image signal is expanded according to the above expansion ratio by means of interpolation using an arithmetic circuit.

For example, when a VGA image signal is converted to an XGA image signal, the required expansion ratio is 1.6. This expansion ratio may be achieved for example by converting five data to eight data. More specifically, eight data h, i, j, k, l, m, n, and o are produced by means of calculation from five original data A, B, C, D, and E as shown ion FIG. 10. The calculation may be performed using the following equations:

$$h=A\times1.0 \text{ for data } h,$$

$$i=A\times0.3+B\times0.2 \text{ for data } i,$$

$$j=B\times1.0 \text{ for data } j,$$

$$k=B\times0.1+C\times0.4 \text{ for data } k,$$

$$l=C\times0.4+D\times0.1 \text{ for data } l,$$

$$m=D\times1.0 \text{ for data m for data } m,$$

$$n=D\times0.2+E\times0.3 \text{ for data } n,$$

and $$o=E\times1.0 \text{ for data } o.$$

In the standards described above, each pixel usually consists of three dots representing red (R), blue (B), and green (G), respectively.

When images according to various standards are modified so as to fit them to the display panel, it is required to expand or reduce the image including characters or the like such that the expanded or reduced image is displayed over the fixed display area of the screen.

The following signal expansion techniques are known in the art of the display device.

In one technique, the resolution of given image data is detected using a detection circuit and an expansion ratio is set depending on the ratio of the resolution of the display panel to the detected resolution of the image data. One frame of image data is stored in a frame memory and two consecutive lines of image data are read at a time from the frame memory. The two lines of image are expanded according to the above expansion ratio by means of interpolation using an arithmetic circuit, and resultant image is displayed on the display panel.

In the structure in which pixels each consisting of three dots are arranged in a matrix fashion, original luminance data to be displayed on three dots in each line are expanded using the arithmetic circuit wherein luminance is weighted by predetermined factors. The resultant expanded luminance data is applied to dots of respective pixels so that an image expanded in the direction along the line is displayed on the display panel.

In the above-described techniques, data calculation and re-sampling are required. Besides, an additional memory is required. As a result, the circuit becomes greater in scale and thus it becomes difficult to achieve a small-sized display device and higher cost is required.

One technique of displaying an expanded image without using an additional memory is to employ a display device constructed as shown in FIG. 26, which will be further improved according to the present invention as will be described later.

The display device shown in FIG. 26 includes a thin-film transistor liquid crystal display panel 201 including source interconnection lines and gate interconnection lines extending in a matrix fashion, first horizontal driver 202 and a second horizontal driver 203 connected to the source interconnection lines of the display panel 201, a vertical driver 204 connected to the gate interconnection lines of the display panel 201, and a signal processing circuit 205 for controlling the drivers 202, 203, and 204.

The signal processing circuit 205 includes a sampling circuit 207 to which an image signal or an original data is input, a frequency divider 208 and a signal selection circuit 209 both connected to the sampling circuit 207, a horizontal control circuit 210 for controlling the horizontal drivers 202 and 203, and a vertical control circuit 211 for controlling the vertical driver 204. A clock generator 212 is connected to the signal processing circuit 205. The liquid crystal display panel 201 employed herein is assumed to be of the XGA type including 1024 pixels in the horizontal direction and 768 pixels in the vertical direction.

In the display device shown in FIG. 26, if original data or an image signal according to the VGA standard (at a clock frequency of 27.175 MHz) such as a signal H (ABCDE . . . ) shown in FIG. 27 is input to the signal processing circuit 205, the signal is input to the sampling circuit 207. In synchronization with a sampling clock signal at 40.28 MHz, the sampling circuit 207 produces converted data I (AABCCDEE . . . ) as shown in FIG. 27. The resultant converted data I is sent to the frequency divider 208. In the above operation, in order to convert the VGA image signal with 1H=640 data to an XGA signal with 1H=1024 data, it is required to increase the number of data by a factor of 1.6 and thus the sampling is performed at a sampling clock frequency of 40.28 MHz which is 1.6 times the original clock frequency of 27.175 MHz.

After that, the converted data is divided by the frequency divider 208 into odd-numbered signals and even-numbered signals. The odd-numbered signals ABCE, . . . , which are represented by J in FIG. 27, are supplied via the signal selection circuit 209 to the first horizontal driver 202. Similarly, the even-numbered signals ABCE, . . . , which are represented by K in FIG. 27, are supplied to the second horizontal driver 203.

The horizontal control circuit 210 controls the drivers 202 and 203 so that signals are supplied to the source interconnection lines of the liquid crystal display panel 201 alternately from the first horizontal driver 202 and the second horizontal driver 203 thereby allowing the liquid crystal display panel 201 designed to display XGA images to display data AABCCDEE . . . as shown in FIG. 27 (data L) and also as shown on the liquid crystal panel 201 in FIG. 26.

On the other hand, in the case where XGA image signal is input as original data, the image signal is directly sent to the frequency divider 208 as represented by I' in FIG. 26 without being passed through the sampling circuit 207, and is subjected to the same dividing process in the frequency divider 208 as that described above. The XGA image signal is divided by the signal selection circuit 209 into two parts and supplied to the liquid crystal display panel 201. The divided signals are combined together on the display panel 201, and thus an XGA image is displayed thereon.

As described above, by employing the circuit shown in FIG. 26, it is possible to convert an original VGA image signal to XGA image signal by means of re-sampling the original image signal. The resultant XGA image signal is supplied to the liquid crystal display panel 201 and thus an XGA image originated from the VGA image signal is displayed on the liquid crystal display device 201.

However, the both signal expanding techniques described above have their own problems.

In the first technique, when an image signal generated by a personal computer is input as original data, miss-sampling can occur due to the difference from an ordinary image signal. The miss-sampling can cause flicker which results in degradation in image quality. Another problem is that when sampling is not performed at maximum and minimum values of the waveform of a given analog signal, a reduction in contrast occurs.

The problem of the second technique is that original data is not perfectly preserved after conversion and degradation in image quality such as a reduction in contrast can occur. In the specific example shown in FIG. 10, four data A, B, D, and E of the original data A, B, C, D, and E are converted by multiplying them by a factor of 1.0 and thus these data are directly employed as the converted data h, j, m, and o, respectively. However, the original data C is dispersed into components of the converted data k and l, and thus the data C is not preserved in its original form after the conversion. Therefore, although the overall converted image will be similar to the original image, a loss can occur in some individual data as is the case for data C in this specific example. Such a loss of data can cause a reduction in contrast.

The circuit configuration shown in FIG. 26 requires an additional circuit for generating a clock signal at a frequency different from that of original data. This result in an increase in the scale of the circuit which makes it difficult to achieve a small-sized display device. Furthermore, the operation at a higher frequency results in an increase in power consumption. For example, if a signal processing circuit which needs power consumption of 250 mW at a normal frequency is operated at a higher frequency, the power consumption will increase to about 400 mW. Furthermore, in the sampling operation on digital data at a different frequency, it is needed to meet severe requirements in terms of the sampling setup time and hold time. These severe requirements can cause degradation in reliability of the display device and also degradation in image quality.

SUMMARY OF THE INVENTION

In view of the above, it is an object of the present invention to provide an image display device and a driver circuit for use in the image display device, capable of handling images in various formats with different resolutions, in an easy and highly reliable fashion.

According to an aspect of the present invention, to achieve the above object, there is provided an image display device including a display panel having predetermined numbers of pixels defined in horizontal and vertical directions, respectively, and an interpolated-data generation circuit for producing interpolated data in such a manner that when the number of pixels in the horizontal direction of the display panel is greater than the number of pixels in the horizontal direction of an image signal, a plurality of original image data of the image signal at original locations along one horizontal pixel line are directly stored at data storage locations closest to the corresponding original locations, and data for the remaining data storage locations are each calculated from two original image data at locations adjacent to the respective data storage locations and resultant data are stored in the respective remaining data storage locations.

In the image display device according to the present invention, the interpolated data generation circuit preferably generates interpolated data such that a plurality of original image data of the image signal at original locations are directly stored at data storage locations closest to the corresponding original locations, and data for the remaining data storage locations are given such that either one of two original image data at adjacent data storage locations are stored in the respective remaining data storage locations wherein the data at each remaining data storage location is switched between two original image data at adjacent data storage locations from one horizontal pixel line to another adjacent horizontal pixel line of the image signal. Alternatively, the interpolated data generation circuit may generate interpolated data such that data for the remaining data storage locations are given in such a manner that either one of two original image data at adjacent data storage locations are stored in the respective remaining data storage locations wherein the data at each remaining data storage location is switched every image frame between two original image data at adjacent data storage locations.

As can be seen from the above description, the most distinctive feature of the image display device according to the present invention is in that a plurality of original image data are directly stored, without being subjected to any process, at data storage locations closest to original data locations. The data for data storage locations remaining after storing the original image data are given in any one of the following three manners:

(1) The data for each remaining data storage location is calculated from two original data stored at locations adjacent to the remaining data storage location.

(2) Either one of two original data at locations adjacent to each remaining data storage location is employed wherein the two data are alternately employed from one horizontal pixel line to another adjacent line.

(3) Either one of two original data at locations adjacent to each remaining data storage location is employed wherein the two data are alternately employed from one image frame to another frame.

The calculation in (1) may be accomplished for example by multiplying two adjacent original image data by proper factors and then adding them together. In the second conventional technique described earlier, a loss of original data which occurs during the conversion process causes a reduction in contrast. When a signal is expanded, the number of data always becomes greater after conversion than the number of original data. Taking this fact into account, in the image display device according to the present invention, when an image signal is expanded, data storage locations are first assigned in an interpolated-data generation circuit, and then original data are directly stored at data storage locations closest to the respective original locations of the original data. At data storage locations remaining after storing the original data, either of two original data at locations adjacent to the respective remaining data storage locations or data calculated from two original data at locations adjacent to the respective remaining data storage locations are stored. In any case, the image display device according to the present invention does not encounter a loss of original data during the conversion and thus it is possible to display an expanded image on the display panel while maintaining the contrast at the same level as that of the original image without encountering degradation in image quality.

In the interpolated-data generation circuit, in the case where the data at data storage locations remaining after storing original data are given by the sums of original data at locations adjacent to the respective remaining data storage locations multiplied by proper factors, it is desirable that the factors be determined so that the difference between the maximum and minimum expansion ratios of the interpolated data to the corresponding original data becomes less than 25% of the maximum expansion ratio.

If the above requirement is met, the average brightness of the original image is maintained after the conversion.

The process of expanding an image signal in the horizontal direction has been described above for the case where the number of pixels in the horizontal direction of the display panel is greater than the number of pixels in the horizontal direction of the image signal. Expansion may also be performed in the vertical direction in a similar manner as described below.

That is, according to another aspect of the present invention, there is provided an image display device including a display panel having predetermined numbers of pixels defined in horizontal and vertical directions, respectively, and an interpolated-data generation circuit for producing interpolated data in such a manner that when the number of pixels in the vertical direction of the display panel is greater than the number of pixels in the vertical direction of an image signal, a plurality of original image data of the image signal at original locations along one vertical pixel column are directly stored at data storage locations closest to the corresponding original locations, and data for the remaining data storage locations are each calculated from two original image data at locations adjacent to the respective data storage locations and resultant data are stored in the respective remaining data storage locations.

As in the horizontal direction, the data for data storage locations remaining after storing the original image data may be given in any one of the following three manners: the data for data storage locations remaining after storing the original data are each calculated from two original image data at locations adjacent to the respective data storage locations and resultant data may be stored in the respective remaining data storage locations; either one of two original data at locations adjacent to each remaining data storage location is employed wherein the two data are alternately employed from one pixel location to another adjacent location along the vertical column; or either one of two original data at locations adjacent to each remaining data storage location is employed wherein the two data are alternately employed from one image frame to another image frame.

In the expansion in the vertical direction, as in the horizontal direction, if the factors are set such that the difference between the maximum and minimum expansion ratios of the image data obtained after the interpolation relative to the corresponding original image data becomes less than 25% of the maximum expansion ratio, then it becomes possible to maintain the average brightness of the image at the same level as that of the original image. In the present invention, the term "one frame" is used to represent one complete image and the term "one field" is used to represent any one of a plurality of images which are parts of one frame.

According to another aspect of the present invention, there is provided a driver circuit for use in an image display device, comprising a display panel having predetermined numbers of pixels defined in horizontal and vertical directions, respectively; a pair of source drivers connected to the display panel, for supplying a horizontal image signal having the predetermined number of pixels in the horizontal direction to the display panel; image signal lines which divide a given image signal into two identical signals and transmit them to both source drivers; and a horizontal image signal control circuit for supplying a pair of sampling timing signals to the pair of source drivers, respectively, thereby making the respective source drivers generate horizontal image signals each having a smaller number of pixels in the horizontal direction than the predetermined number such that a horizontal image signal having the predetermined number of pixels in the horizontal direction is obtained when the horizontal image signals generated by the pair of source drivers are combined.

If the driver circuit configured in the above-described manner is employed, by adjusting the sampling timing signal it is possible to make the source drivers generate image signals which will be combined together on the display panel so that an image with a resolution well matched with the resolution of the display panel is displayed thereon, without requiring either an additional memory or an additional clock generator. This makes it possible to achieve a reduction in the size of the circuit and a reduction in power consumption. Furthermore, the reliability of the display device is improved.

According to still another aspect of the present invention, there is provided a driver circuit for use in an image display device, comprising a display panel having predetermined numbers of pixels defined in horizontal and vertical directions, respectively; a pair of source drivers connected to the display panel, for supplying a horizontal image signal having the predetermined number of pixels in the horizontal direction to the display panel; a signal selection circuit which generates two image signals by copying a given image signal when the given image signal has a smaller number of pixels in the horizontal direction than the predetermined number, or generates two image signals by dividing the given image signal into two parts when the given image signal has the predetermined number of pixels in the horizontal direction, and then transmitting the resultant copied or divided image signals to the respective source drivers; a resolution detecting circuit for determining on the basis of a synchronizing signal whether the given image signal has the predetermined number of pixels in the horizontal direction or a smaller number of pixels in the horizontal direction than the predetermined number and supplying a control signal to the signal selection circuit to indicate whether the signal selection circuit should output the copied image signals or divided image signals; a frequency divider for dividing the given image signal into two parts and supplying resultant divided image signals to the signal selection circuit; and a horizontal image signal control circuit for supplying a pair of sampling timing signals to the pair of source drivers, respectively, thereby making the respective source drivers generate horizontal image signals each having a smaller number of pixels in the horizontal direction than the predetermined number such that a horizontal image signal having the predetermined number of pixels in the horizontal direction is obtained when the horizontal image signals generated by the pair of source drivers are combined.

With the driver circuit configured in the above-described manner, even when the input image signal has a number of pixels in the horizontal direction greater than the number of pixels in the horizontal direction of the display panel or when the input image signal has a number of pixels in the horizontal direction smaller than the number of pixels in the horizontal direction of the display panel, it is possible to supply an image signal adjusted to have a number of pixels in the horizontal direction well matched with the number of pixels of the display panel by dividing or copying the image signal and then applying it to the sampling process whose timing is controlled depending on the conversion ratio from the number of pixels in the horizontal direction of an input image signal to the number of pixels in the horizontal direction of the display panel. In the above process, the horizontal image signal having the predetermined number of pixels in the horizontal direction is partly removed. Because any arbitrarily specified part of data may be removed, it is possible to handle any conversion ratio.

Thus, it is possible to make the source drivers generate image signals which will be combined together on the display panel so that an image with a resolution well matched with the resolution of the display panel is displayed thereon, without requiring either an additional memory or an additional clock generator. This makes it possible to achieve a reduction in the size of the circuit and a reduction in power consumption. Furthermore, the reliability of the display device is improved.

According to still another aspect of the present invention, there is provided a driver circuit for use in an image display device, comprising a display panel having predetermined numbers of pixels defined in horizontal and vertical directions, respectively; a source driver connected to the display panel, for supplying a horizontal image signal having the predetermined number of pixels in the horizontal direction to the display panel; an image signal line for sequentially transmitting image signals, obtained by copying a given image signal, to the source driver; and a horizontal image signal control circuit for sequentially supplying a pair of sampling timing signals to the source driver thereby making the source driver sequentially generate horizontal image signals each having a smaller number of pixels in the horizontal direction than the predetermined number.

Alternatively, the horizontal image signal control circuit may sequentially supply a pair of sampling timing signals to the source driver thereby making the source driver generate a horizontal image signal while removing some part of the given original image signal so that the resultant image signal has a reduced number of pixels in the horizontal direction compared to the original number wherein the data location at which data is removed from the given original image signal is varied at least every field, or every line, or every predetermined period of time.

By performing the signal processing in the above-described manner, it is possible to output an image with a resolution well matched with the resolution of the display panel without requiring either an additional memory or an additional clock generator. This makes it possible to achieve a reduction in the size of the circuit and a reduction in power consumption. Furthermore, the reliability of the display device is improved.

In order to produce a horizontal image signal having a smaller number of pixels in the horizontal direction than the predetermined number, the original signal has to be partly removed. However, it is possible to obtain an image similar to the original image by sequentially supplying the partly removed data to the display device or by supplying the partly removed data field by field or line by line or every predetermined period of time thereby averaging the partly removed parts over the entire screen. The partly removal of the data can be easily accomplished by temporarily stopping the clock signal to the source driver thereby temporarily stopping the sampling operation on the data.

According to still another aspect of the present invention, there is provided a driver circuit for use in an image display device, comprising a display panel having predetermined numbers of pixels defined in horizontal and vertical directions, respectively; a source driver connected to the display panel, for supplying a horizontal image signal having the predetermined number of pixels in the horizontal direction to the display panel; a signal selection circuit which generates two image signals by copying a given image signal when the given image signal has a smaller number of pixels in the horizontal direction than the predetermined number, or generates two image signals by dividing the given image signal into two parts when the given image signal has said predetermined number of pixels in the horizontal direction, and then sequentially transmitting the resultant copied or divided image signals to the source driver; a resolution detecting circuit for determining on the basis of a synchronizing signal whether the given image signal has the predetermined number of pixels in the horizontal direction or a smaller number of pixels in the horizontal direction than the predetermined number and supplying a control signal to the signal selection circuit to indicate whether the signal selection circuit should output the copied image signals or divided image signals; a frequency divider for dividing the given image signal into two parts and supplying resultant divided image signals to the signal selection circuit; and a horizontal image signal control circuit for sequentially supplying a pair of sampling timing signals to the source driver thereby making the source driver sequentially generate horizontal image signals each having a smaller number of pixels in the horizontal direction than the predetermined number such that a horizontal image signal having the predetermined number of pixels in the horizontal direction is obtained when the horizontal image signals sequentially generated by the source driver are combined.

Alternatively, the horizontal image signal control circuit may sequentially supply a pair of sampling timing signals to the source driver thereby making said source driver generate horizontal image signals while removing some part of the given original image signal so that the resultant image signal has a reduced number of pixels in the horizontal direction compared to the original number such that a horizontal image signal having the predetermined number of pixels in the horizontal direction is obtained when the horizontal image signals sequentially generated by the source driver are combined, wherein the data location at which data is removed from the given original image signal is varied at least every field, or every line, or every predetermined period of time.

In order to generate horizontal image signals having a smaller number of pixels in the horizontal direction than the predetermined number, which will be combined again into a single image having the above-described predetermined number of pixels, the original signal has to be partly removed. However, it is possible to obtain an image similar to the original image by sequentially supplying the partly removed data to the display device or by supplying the partly removed data field by field or line by line or every predetermined period of time thereby changing the locations where data are removed thus averaging the partly removed parts over the entire screen.

BRIEF DESCRIPTION OF THE DRAWINGS

FIG. 28 is a table showing an example of the relationship between the size of a display device and the number of pixels of image data; and FIG. 29 is a table showing another example of the relationship between the size of a display device and the number of pixels of image data.

DESCRIPTION OF THE PREFERRED EMBODIMENTS

A first embodiment of an image display device according to the present invention is described below with reference to FIG. 1 and FIG. 2.

Figure 1:
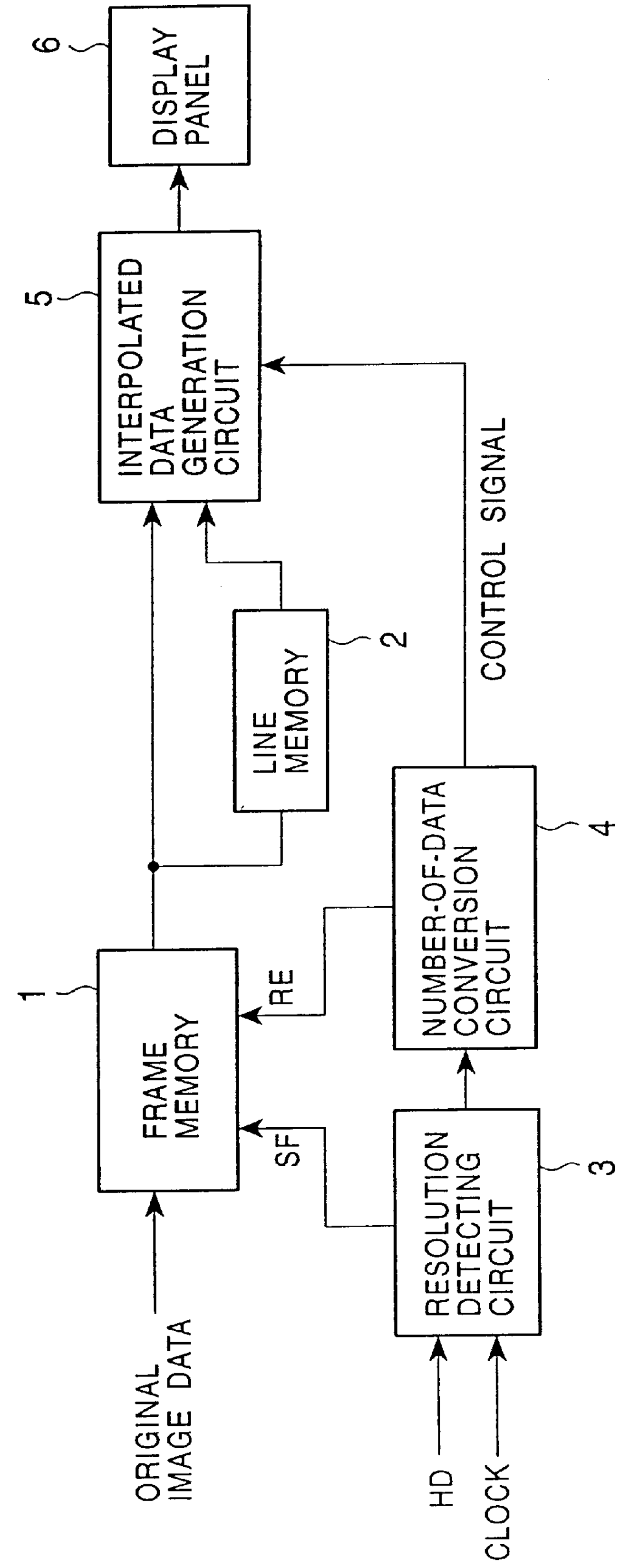
FIG. 1 is a block diagram schematically illustrating the construction of a first embodiment of an image display device according to the present invention.

FIG. 1 is a block diagram schematically illustrating the construction of an image display device of this embodiment. FIG. 2 schematically illustrates data structures of image data before and after interpolation.

The image display device of the present embodiment includes a circuit for expanding original image data wherein the circuit includes, as shown in FIG. 1, a frame memory 1, a line memory 2, a resolution detecting circuit 3, a number-of-data conversion circuit 4, and an interpolated-data generation circuit 5. An interpolated digital signal is generated by the interpolated-data generation circuit 5 and supplied to a display panel 6. Although not shown in the figures and not described in further detail, the image display device according to the present embodiment also includes a driver circuit for driving the display panel 6, a control circuit, and other circuits.

In this embodiment, the display panel 6 is assumed to have a resolution according to the XGA standard (the number of pixels in the horizontal direction is 1024). It is also assumed that a video signal with a resolution according to the VGA standard (the number of pixels in the horizontal direction is 640) is input. The flow of data in this embodiment is described below for the case where an image signal is expanded (interpolated) in the horizontal direction by a factor of 1.6. Herein, a description is given only for the expansion process in the horizontal direction and the expansion in the vertical direction will be described later with reference to another embodiment.

First, original image data with a frequency of 25.175 MHz according to the VGA standard is written into the frame memory 1. The frame memory 1 is designed to store data on a frame-by-frame basis. Herein, the original data is assumed to have already been converted into digital form. Then, a read enable signal (denoted by RE in FIG. 1) and a shift control signal (denoted by SF in FIG. 1) are supplied to the frame memory 1 from the number-of-data conversion circuit 4 which will be described later. In response, the frame memory 1 transmits the data stored therein to the interpolated-data generation circuit 5 and also to the line memory 2. The line memory 2 stores data along one horizontal line and produces a delayed data on a line-by-line basis.

If a horizontal synchronizing signal (denoted by HD in FIG. 1) and a clock signal (denoted by CLOCK in FIG. 1) are input to the resolution detecting circuit 3, the resolution detecting circuit 3 determines which of standards, VGA, SVGA, XGA, etc., the given original data is based on, and outputs a signal depending on the detected standard to the number-of-data conversion circuit 4.

Depending on the conversion ratio, the number-of-data conversion circuit 4 generates a control signal which will be used by the interpolated-data generation circuit 5 to generate storage locations where the data will be stored. The resultant control signal is output to the interpolated-data generation circuit 5. Because the conversion ratio is assumed to be 1.6 in the present embodiment, the number of data is converted such that for example five data are increased to eight data. Thus, in the case where the signal received from the resolution detection circuit 3 indicates that the original data is based on the VGA standard, the number-of-data conversion circuit 4 generates a control signal indicating that eight data storage locations, five of which are for storage of original data and remaining three are for interpolated data, should be generated, and the number-of-data conversion circuit 4 outputs the resultant control signal to the interpolated-data generation circuit 5.

Figure 2:
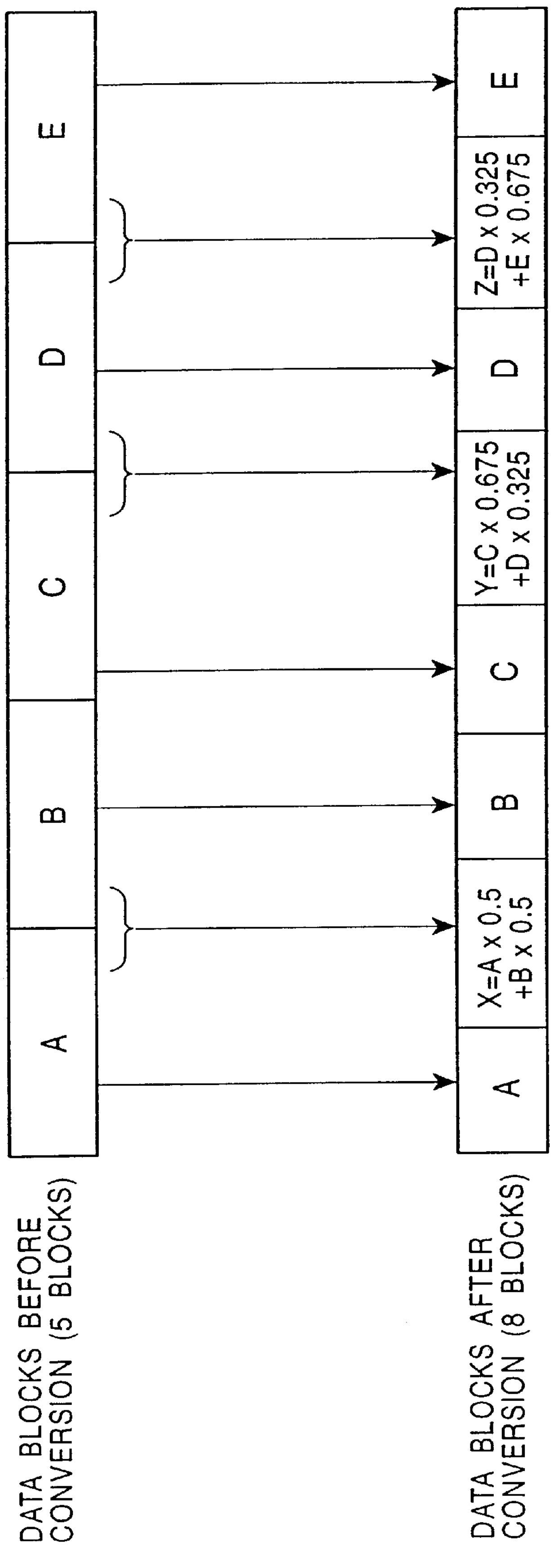
FIG. 2 schematically illustrates data structures of image data obtained before and after interpolation according to the first embodiment of the invention.

The interpolated-data generation circuit 5 divides the given image signal consisting of 640 image data per horizontal pixel line into blocks each including five data A, B, C, D, and E, as shown in FIG. 2. The interpolated-data generation circuit 5 then creates three data storage locations in each block for storing interpolated data. Thus, the number of data storage locations in each block is increased to eight. The original data A, B, C, D, and E are directly stored into five of eight data storage locations (as represented by arrows in FIG. 2). In the above process, the original data are stored at data storage locations closest to the corresponding original locations as shown in FIG. 2, rather than in such a manner that all five original data are stored at five consecutive locations starting from the leftmost location. After storing the original data, there will be three vacant locations, between A and B, between C and D, and between D and E, available for three interpolated data X, Y, and Z.

At these three vacant locations, three interpolated data X, Y, and Z each calculated from adjacent two original data are then stored (as represented by arrows in FIG. 2). That is, data X is calculated from data A and B and the result is stored at the location between A and B, data Y is calculated from data C and D and the result is stored at the location between C and D, and data Z is calculated from data D and E and the result is stored at the location between D and E, In this specific example of the present embodiment, data X, Y, and Z are given as $$X = A \times 0.5 + B \times 0.5,$$

$$Y = C \times 0.675 + D \times 0.325,$$

and $$Z = D \times 0.325 + E \times 0.675.$$

As a result, image data are expanded such that data A is expanded by a factor of 1.5, B by a factor of 1.5, C by a factor of 1.675, D by a factor of 1.65, and E by a factor of 1.675, relative to the original data.

The manner in which interpolated data are generated has been described above in a conceptual fashion. In practice, interpolation is performed by the interpolated data generation circuit 5 including a delay circuit including a plurality of D flip flops, a computing unit, and a selector, such that data are transferred along the D flip flops each time one clock signal is received thereby generating delayed data wherein, depending on the status of the selector, image data A, B, C, D, or E is directly output or interpolated data X, Y, or Z calculated from two image data using the computing unit according to the above-described equations is output. In the above process, the status of the selector is switched according to a selector control signal given from the number-of-data conversion circuit 4.

In the image display device according to the present embodiment, as described above, data conversion is performed such that the original data A, B, C, D, and E are stored at locations, of the eight data storage locations, closest to the corresponding original locations, and such that interpolated data X, Y, and Z each calculated from two adjacent original data of A, B, C, D, and E are stored at the remaining three data storage locations. Thus, in the image display device according to the present embodiment, any part of the original data is not lost during the process of converting the original data to the expanded data. This ensures that an expanded image can be displayed over the whole area of the XGA display panel while maintaining the contrast of the original data without resulting in degradation in image quality.

In the present embodiment, the interpolated data is generated according to the above-described equations such that the respective original image data are converted to interpolated data expanded by factors, relative to the original data, of 1.5, 1.5, 1.675, 1.65, and 1.675 for data A, B, C, D, and E, respectively. Therefore, the difference between the maximum expansion ratio (1.675) and the minimum expansion ratio (1.5) becomes 0.175 (=1.675−1.5) which is about 10% of the maximum expansion ratio. The difference is smaller than 25% and thus the variations in the conversion ratio are small enough to maintain the average brightness at the same level as that of the original image.

A second embodiment of an image display device according to the present invention is described below with reference to FIG. 3.

Figure 3:
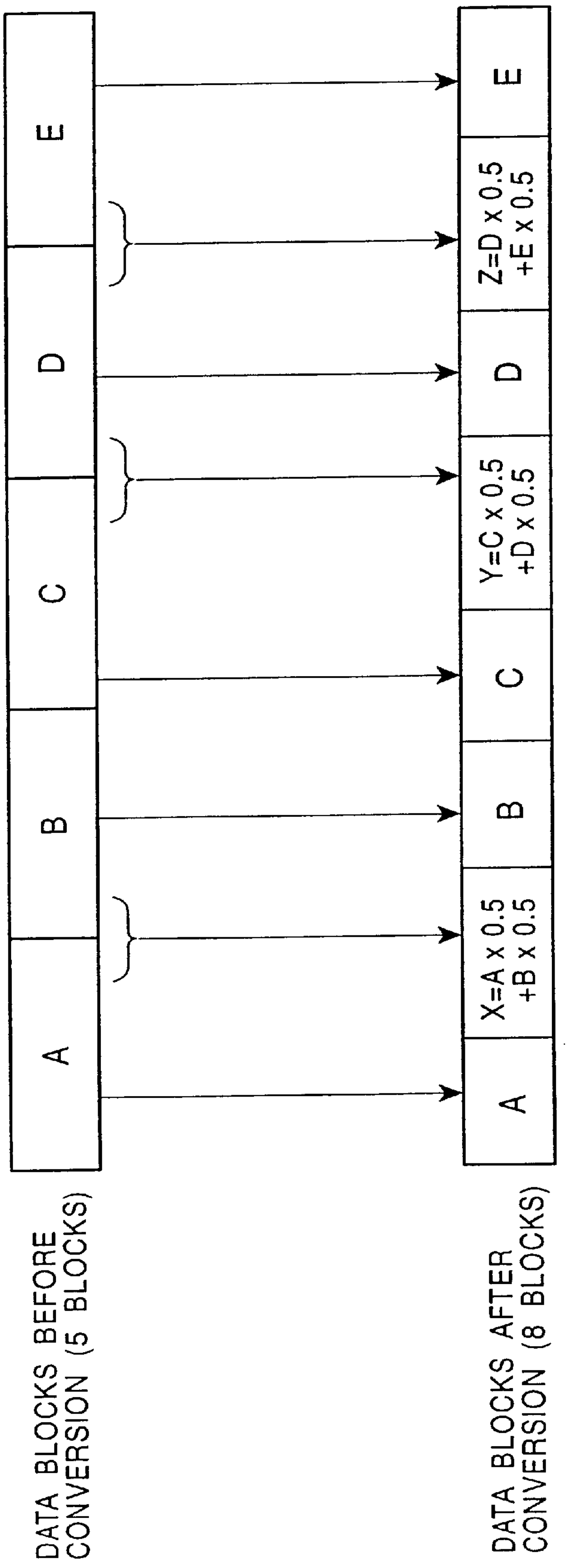
FIG. 3 schematically illustrates data structures of image data obtained before and after interpolation according to a second embodiment of the invention.

FIG. 3 schematically illustrates data structures of image data obtained, in the image display device of the present embodiment, before and after interpolation.

The basic construction of the image display device in the present embodiment is the same as that of the first embodiment, and a VGA image signal is expanded by a factor of 1.6 and the expanded image is displayed on the XGA display device in a similar manner to the first embodiment except that interpolated data are generated according to equations different from those employed in the first embodiment. Thus, a duplicated description of the basic construction of the image display device is not given here.

In the present embodiment, the interpolated-data generation circuit divides a given image signal into blocks each including five data A, B, C, D, and E, as shown in FIG. 3. Then the number of data storage locations for each block is increased to eight, and the original data A, B, C, D, and E are directly stored at five of the eight data storage locations (as shown by arrows in FIG. 3). In the above process, the image data A, B, C, D, and E are stored at locations closest to the original locations as in the first embodiment.

Three interpolated data X, Y, and Z each calculated from adjacent two original data are then stored at three locations assigned to the interpolated data (as represented by arrows in FIG. 2). In the present embodiment, the interpolated data are given by $$X=A\times 0.5+B\times 0.5,$$

$$Y=C\times 0.5+D\times 0.5,$$

and $$Z=D\times 0.5+E\times 0.5.$$

As can be seen, all original data are multiplied by an equal factor of 0.5. That is, the respective original image data are converted to interpolated data expanded by factors, relative to the original data, of 1.5 for data A, 1.5 for B, 1.5 for C, 2.0 for D, and 1.5 for E.

Thus, in the image display device according to the present embodiment, any part of the original data is not lost during the process of converting the original data to the expanded data. This ensures that the contrast of the expanded image is maintained at the same level as that of the original image. Thus, advantages and features similar to those obtained in the first embodiment are also achieved in this embodiment.

Because the respective original image data are converted to interpolated data expanded by factors of 1.5, 1.5, 1.5, 2.0 and 1.5 for data A, B, C, D, and E, respectively, relative to the original data, the difference between the maximum expansion ratio (2.0) and the minimum expansion ratio (1.5) becomes 0.5 which is 25% of the maximum expansion ratio. This small value of the difference allows the average brightness of the image to be maintained at the same level as that of the original image.

Because the multiplication factors by which the original data are multiplied are all set to 0.5 in the present embodiment, the interpolated-data generation circuit needs a less complicated circuit configuration compared to that employed in the first embodiment in which digital data are multiplied by various factors such as 0.675, 0.325, etc.

A third embodiment of an image display device according to the present invention is described below with reference to FIG. 4.

Figure 4:
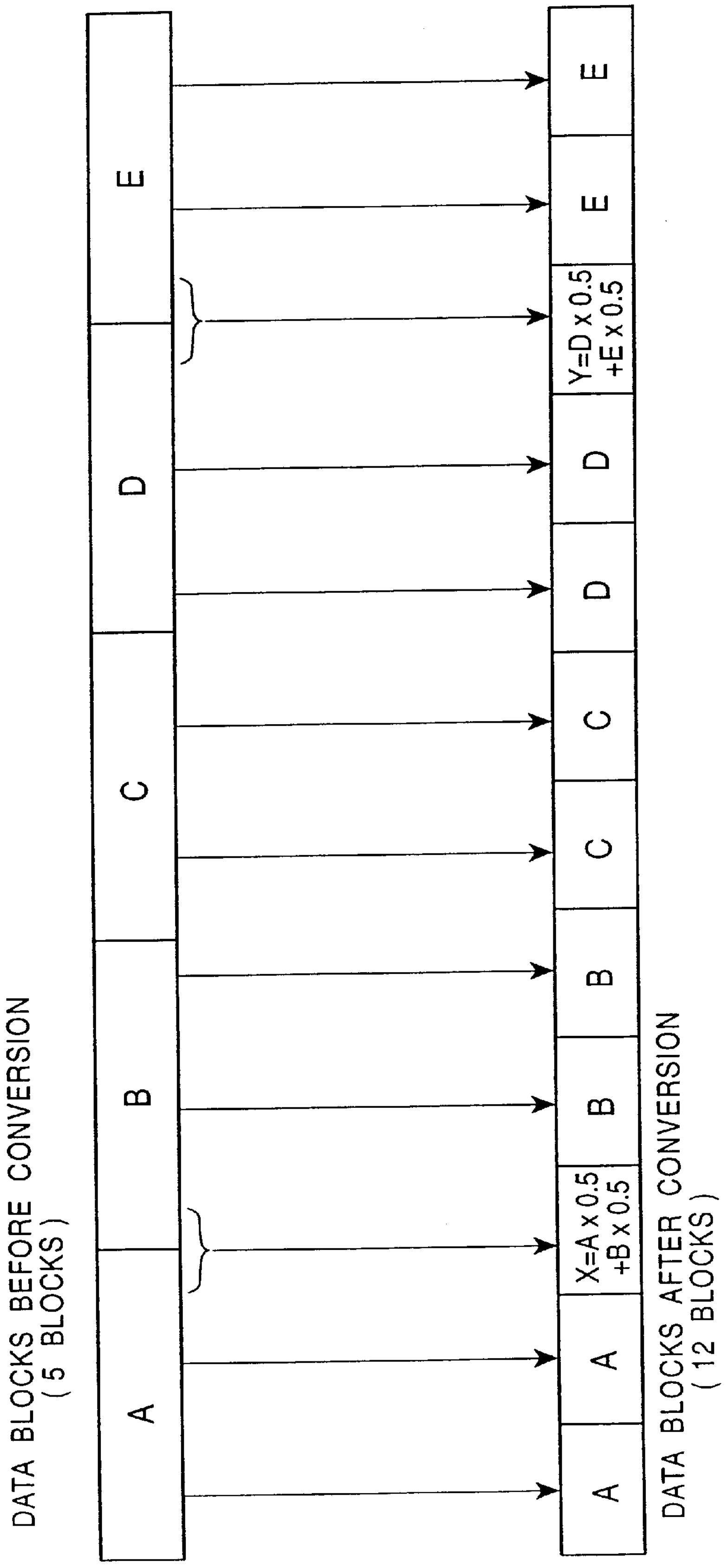
FIG. 4 schematically illustrates data structures of image data obtained before and after interpolation according to a third embodiment of the invention.

FIG. 4 schematically illustrates data structures of image data obtained, in the image display device of the present embodiment, before and after interpolation.

The basic construction of the image display device in the present embodiment is the same as that of the first or second embodiment. However, in this embodiment, a VGA image signal is expanded by a factor of 2.4 and the expanded image is displayed on a UXGA display device. Thus, a duplicated description of the basic construction of the image display device is not given here.

In the present embodiment, the interpolated-data generation circuit divides a given image signal into blocks each including five units of data A, B, C, D, and E, as shown in FIG. 4. Then the number of data storage locations for each block is increased to twelve, and the original data A, B, C, D, and E are stored at ten of the twelve data storage locations such that each original data are stored at two locations. In the above process, each image data A, B, C, D, E is stored at two locations closest to the corresponding original location (as represented by arrows in FIG. 4).

At two interpolated-data storage locations X and Y between original data A and B and between D and E, respectively, interpolated data each calculated from adjacent two original data A and B or D and E are stored (as represented by arrows in FIG. 4). In the present embodiment, the interpolated data are given by $$X=A\times 0.5+B\times 0.5,$$

and $$Y=D\times 0.5+E\times 0.5.$$

That is, the respective original image data are converted to interpolated data expanded by factors of 2.5 for data A, 2.5 for B, 2.0 for C, 2.5 for D, and 2.5 for E, relative to the original data.

Thus, in the image display device according to the present embodiment, any part of the original data is not lost during the process of converting the original data to the expanded data. This ensures that the contrast of the expanded image is maintained at the same level as that of the original image. Thus, advantages and features similar to those obtained in the first and second embodiments are also achieved in this embodiment.

Because the respective original image data are converted to interpolated data expanded by factors of 2.5, 2.5, 2.0, 2.5, and 2.5 for data A, B, C, D, and E, respectively, relative to the original data, the difference between the maximum expansion ratio (2.5) and the minimum expansion ratio (2.0) becomes 0.5 which is 20% of the maximum expansion ratio. This small value of the difference allows the average brightness of the image to be maintained at the same level as that of the original image.

A fourth embodiment of an image display device according to the present invention is described below with reference to FIG. 5.

Figure 5:
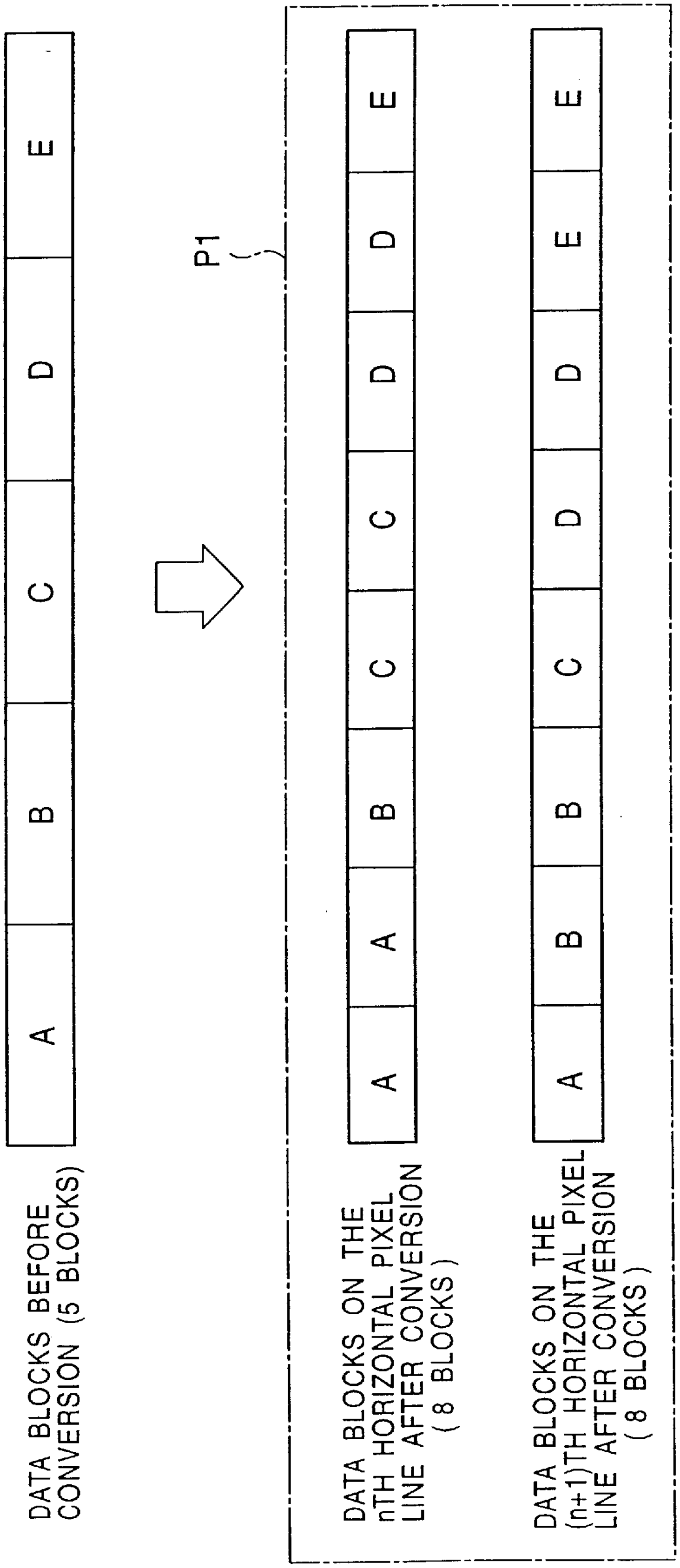
FIG. 5 schematically illustrates data structures of image data obtained before and after interpolation according to a fourth embodiment of the invention.

FIG. 5 schematically illustrates data structures of image data obtained, in the image display device of the present embodiment, before and after interpolation. This embodiment provides another example in which a VGA image signal is expanded by a factor of 1.6 and displayed on a XGA display panel as in the first and second embodiments.

In the first through third embodiments described above, interpolated data is generated using data along one horizontal line thereby increasing the number of data. In the present embodiment, unlike the previous embodiments in which data is calculated from data along one horizontal line, either one of two original data at locations adjacent to each interpolated-data storage location is stored at that interpolated-data storage location wherein the two original data are alternately employed from one horizontal pixel line to another adjacent line.

The basic construction of the image display device in the present embodiment is the same as that shown in FIG. 1 although any further description is not given here.

That is, in the present embodiment, the interpolated-data generation circuit divides a given image signal consisting of 640 image data per horizontal pixel line into blocks each including five data A, B, C, D, and E, as shown in FIG. 5. The interpolated-data generation circuit then creates three data storage locations in each block for storing interpolated data. Thus, the number of data storage locations in each block is increased to eight. The original image data A, B, C, D, and E are directly stored at locations, of the eight data storage locations, closest to the corresponding original locations.

Then at each of three data storage locations for storing interpolated data X, Y, and Z, between A and B, between C and D, and between D and E, respectively, either one of two original data at locations adjacent to the corresponding interpolated-data storage location is stored wherein the two original data are alternately employed from one horizontal pixel line to another adjacent line of the image signal. That is, if A is stored at the interpolated-data storage location X, C at Y, and D at Z in a first horizontal pixel line, then B is stored at the interpolated-data location X, D at Y, and E at Z in the following second line. In the following process, data A and B are alternately stored at the interpolated-data storage location X between nth horizontal pixel line and (n+1)th horizontal pixel line adjacent to the nth horizontal pixel line. Similarly, data C and D are alternately stored at Y and data D and E are alternately stored at Z (as shown in a box P1 represented by an alternate long and short dash line in FIG. 5).

In the present embodiment, the image display device does not need the arithmetic unit in the interpolated-data generation circuit 5 shown in FIG. 1. The line-by-line switching of the data stored at the interpolated-data storage locations can be accomplished by changing the selector control signal transmitted from the number-of-data conversion circuit 4 to the interpolated-data generation circuit 5 thereby controlling the selector.

In the present embodiment, unlike the first through third embodiments, interpolation is not performed from data along one horizontal pixel line. Instead, interpolation is accomplished by switching data every horizontal pixel line. When viewed by a user, this brings about effects equivalent to those obtained when interpolated is performed by means of calculation using the following equations for the respective interpolated-data storage locations:

$$X=A\times 0.5+B\times 0.5,$$

$$Y=C\times 0.5+D\times 0.5,$$

and $$Z=D\times 0.5+E\times 0.5.$$

On average over the entire area of the display panel, the image data are expanded by ratios of 1.5 for A, 1.5 for B, 1.5 for C, 2.0 for D, and 1.5 for E. That is, the image data are expanded by equivalently the same factors as in the second embodiment.

In the image display device according to the present embodiment, although the manner in which interpolated data are produced is different from that employed in the first through third embodiments, the present embodiment is the same as the first through third embodiments in that the individual original data are preserved and thus no loss of original data occurs during the conversion process. Therefore, the present embodiment has the advantage that the contrast of the image is maintained at the same level of the original image as in the first through third embodiments.

A fifth embodiment of an image display device according to the present invention is described below with reference to FIG. 6.

Figure 6:
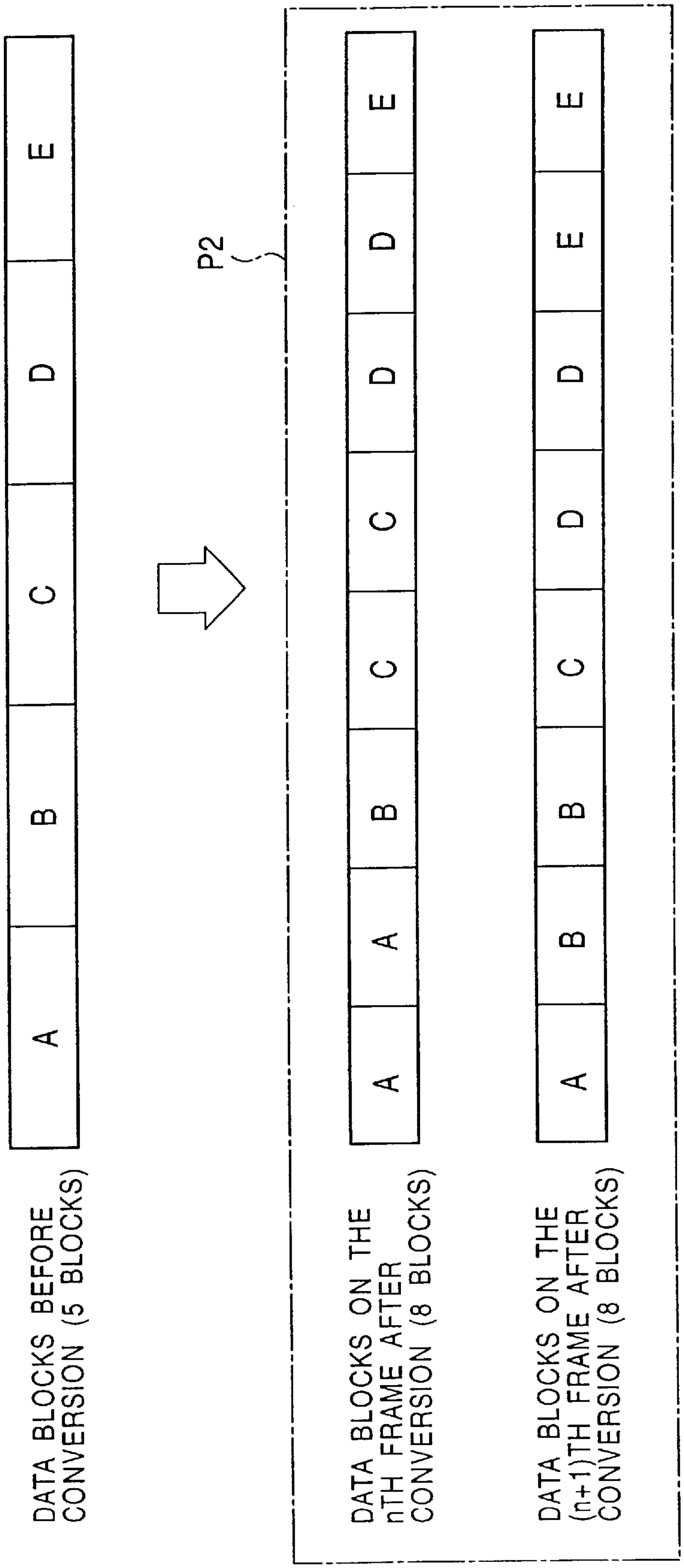
FIG. 6 schematically illustrates data structures of image data obtained before and after interpolation according to a fifth embodiment of the invention.

FIG. 6 schematically illustrates data structures of image data obtained, in the image display device of the present embodiment, before and after interpolation. This embodiment provides another example in which a VGA image signal is expanded by a factor of 1.6 and displayed on a XGA display panel as in the fourth embodiment.

In the fourth embodiment described above, interpolation data is produced by employing either one of two original data at locations adjacent to each interpolated-data storage location wherein the two original data are alternately employed from one horizontal pixel line to another adjacent line. In the present embodiment, interpolation data is produced by employing either one of two original data at locations adjacent to each interpolated-data storage location wherein the two original data are alternately employed on a frame-by-frame basis.

The basic construction of the image display device of the present embodiment is the same as that employed in the first embodiment, and thus any duplicated description is not given here.

In the present embodiment, the interpolated-data generation circuit divides a given image signal consisting of 640 data per horizontal pixel line into blocks each including five data A, B, C, D, and E, as shown in FIG. 6. The interpolated-data generation circuit then creates three data storage locations in each block for storing interpolated data. Thus, the number of data storage locations in each block is increased to eight. The original image data A, B, C, D, and E are directly placed at locations, of the eight data storage locations, closest to the corresponding original locations.

Then at each of three data storage locations for storing interpolated data X, Y, and Z, between A and B, between C and D, and between D and E, respectively, either one of two original data at locations adjacent to the corresponding interpolated-data storage location is stored wherein the two original data are alternately employed by frame by frame. That is, if A is stored at the interpolated-data storage location X, C at Y, and D at Z in an arbitrary horizontal pixel line in an nth frame, then B is stored at the interpolated-data location X, D at Y, and E at Z in the (n+1)th frame which is adjacent, in terms of time, to the nth frame. In this way, data A and B are alternately stored at the interpolated-data storage location X frame by frame. Similarly, data C and D are alternately stored at Y and data D and E are alternately stored at Z frame by frame (as shown in a box P2 represented by an alternate long and short dash line in FIG. 6).

In the present embodiment, the image display device does not need the arithmetic unit in the interpolated-data generation circuit 5 shown in FIG. 1. The frame-by-frame switching of the interpolated data can be accomplished by changing the read enable signal supplied to the frame memory 1.

In this embodiment, interpolation is accomplished by switching data every frame as described above. When viewed by a user, this brings about effects equivalent to those obtained when interpolated is performed by means of calculation using the following equations for the respective interpolated-data storage locations:

$$X=A\times0.5+B\times0.5,$$

$$Y=C\times0.5+D\times0.5,$$

and $$Z=D\times0.5+E\times0.5.$$

On average over the entire area of the display panel, the image data are expanded by ratios of 1.5 for A, 1.5 for B, 1.5 for C, 2.0 for D, and 1.5 for E. Thus contrast of the expanded image is maintained at the same level as that of the original image. That is, advantages and features similar to those obtained in the previous embodiments are also achieved in this embodiment.

A sixth embodiment of an image display device according to the present invention is described below with reference to FIG. 7.

Figure 7:
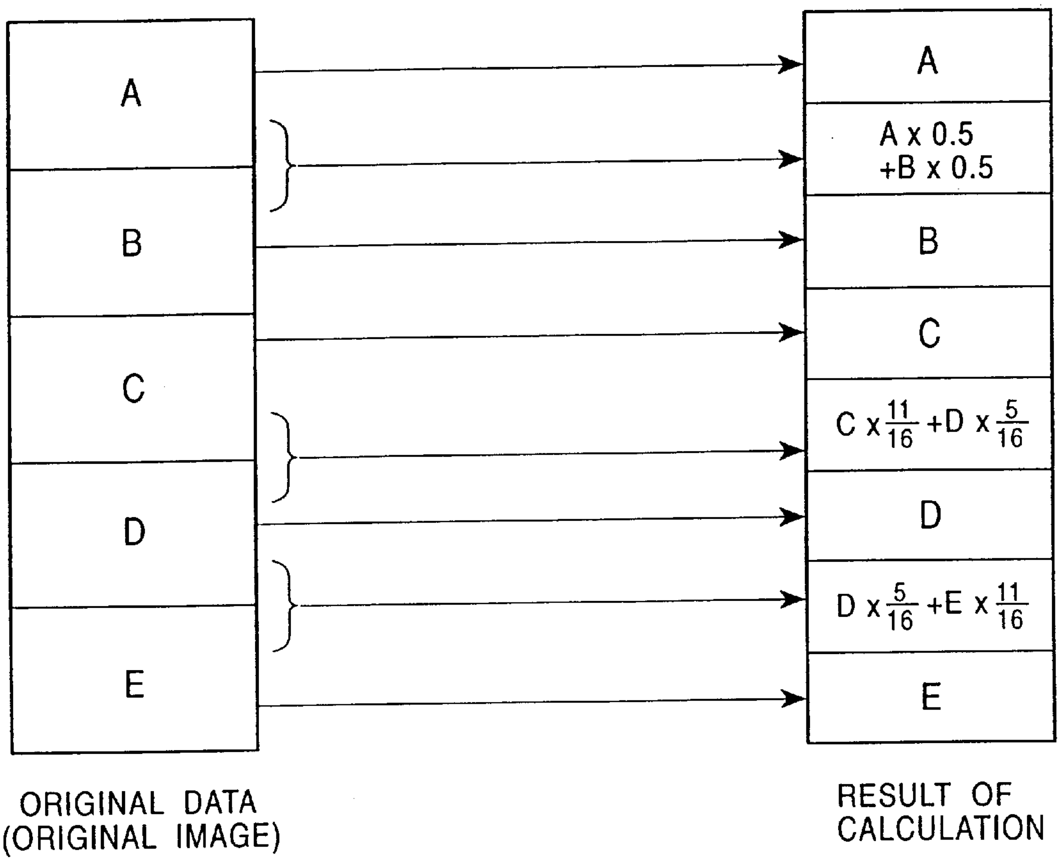
FIG. 7 schematically illustrates data structures of image data obtained before and after interpolation according to a sixth embodiment of the invention.
Figure 8:
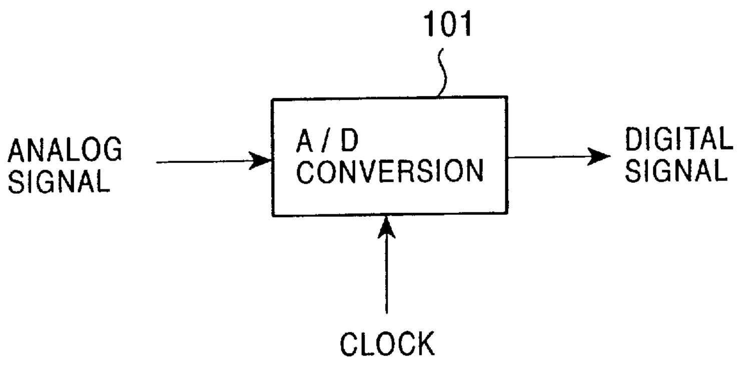
FIG. 8 PRIOR ART
FIG. 8 schematically illustrates a first example of a signal expansion technique used in a conventional image display device.
Figure 9:
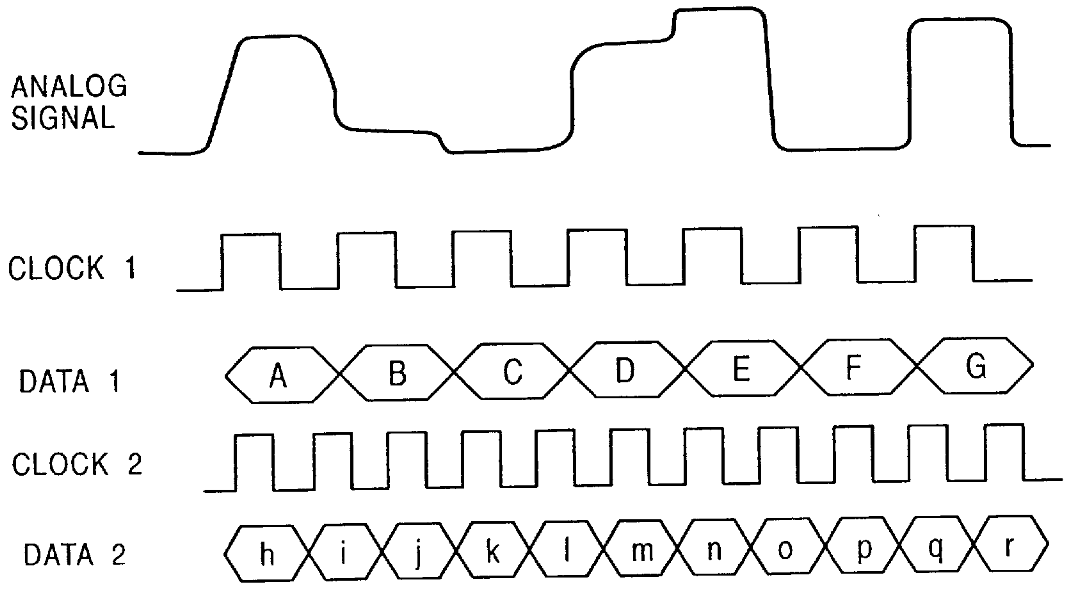
FIG. 9 PRIOR ART
FIG. 9 illustrates waveforms of various signals associated with the first example of the signal expansion technique.
Figure 10:
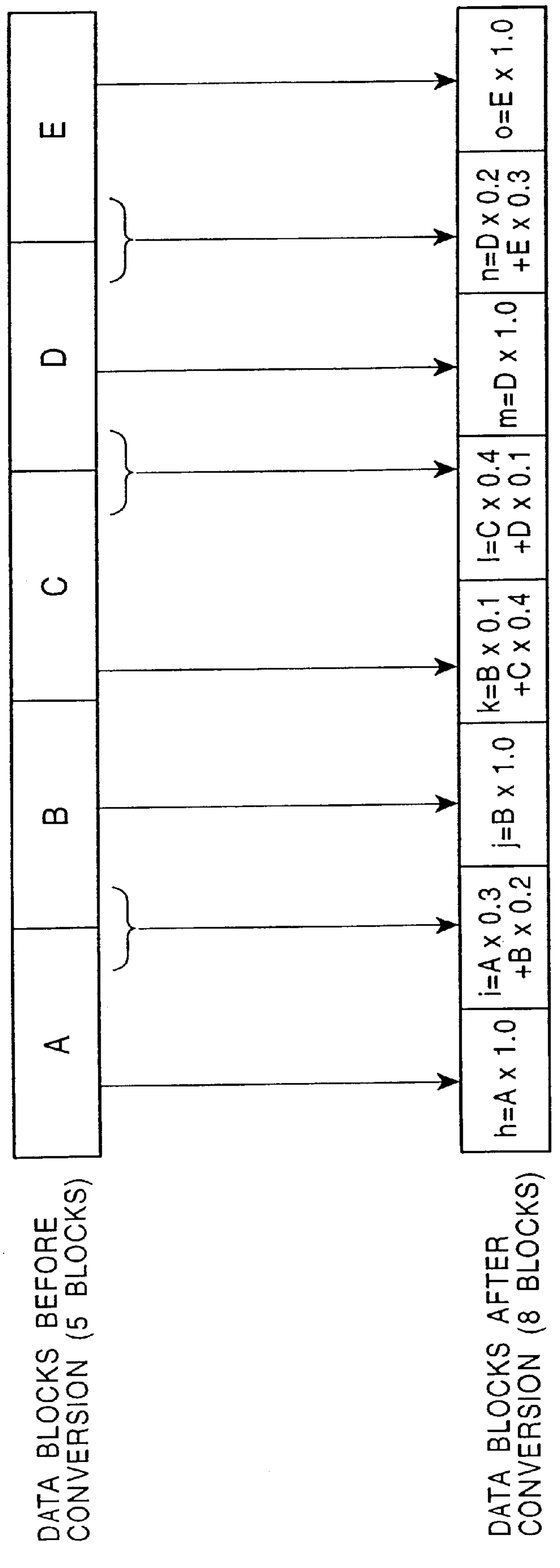
FIG. 10 PRIOR ART
FIG. 10 schematically illustrates a second example of a signal expansion technique used in a conventional image display device.

FIG. 7 schematically illustrates data structures of image data obtained, in the image display device of the present embodiment, before and after interpolation.

In the first through fifth embodiments, methods of expanding data in the horizontal direction have been described. In this sixth embodiment, data expansion in the vertical direction is discussed.

In the image display device according to the present embodiment, original image data is expanded in the vertical direction by a factor of 1.6. The basic construction of the image display device of the present embodiment is the same as that employed in the first through fifth embodiments, and thus any duplicated description is not given here.

In the present embodiment, as shown in FIG. 7, the interpolated-data generation circuit divides image data into blocks each including five data A, B, C, D, and E, each taken from different five horizontal pixel lines. Then the number of data storage lines for each block is increased to eight, and the original data A, B, C, D, and E are directly stored at five of the eight data storage lines (as shown by arrows in FIG. 7). In the above process, the original image data A, B, C, D, and E are stored at data storage lines (data storage locations) closest to the corresponding original lines. When data is expanded not only in the vertical direction but also in the horizontal direction, the interpolated-data generation circuit 5 also generates interpolated data in the horizontal direction using the original data stored either in the frame memory 1 or in the line memory 2 in the manner described above with reference to the previous embodiments.

The data to be stored at each of three interpolated-data storage lines is then determined by means of interpolation from original data stored at two lines adjacent to each interpolated-data storage lines, that is, from original data A and B, C and D, and D and E, respectively. More specifically, the interpolation is accomplished using the following equations:

$$A\times0.5+B\times0.5,$$

$$C\times(11/16)+D\times(5/16),$$

and $$D\times(5/16)+E\times(11/16).$$

In the above process, the interpolated-data generation circuit 5 performs vertical interpolation using the data stored in the line memory 2 which is one line previous to the current line and also using two lines of original data stored in the frame memory 1. When interpolation is performed not only in the vertical direction but also in the horizontal direction, the interpolated-data generation circuit 5 also generates interpolated data in the horizontal direction in the manner described above with reference to the previous embodiments. As a result of the interpolation in the vertical direction, data on individual lines are expanded by factors of 1.5 for A, 1.5 for B, 1.6875 for C, 1.625 for D, and 1.6875 for E, relative to the original data.

In the image display device according to the present embodiment, the original data is preserved without encountering any loss during the interpolation process in the vertical direction. This ensures that the contrast of the expanded image is maintained at the same level as that of the original image.

Because the respective original image data are converted to interpolated data expanded by factors of 1.5, 1.5, 1.6875, 1.625, and 1.6875 for data A, B. C, D, and E, respectively, relative to the original data, the difference between the maximum expansion ratio (1.6875) and the minimum expansion ratio (1.5) becomes 0.1875 which is about 11% of the maximum expansion ratio. This small value of the difference allows the average brightness of the image to be maintained at the same level as that of the original image.

The present invention is not limited to the details of the embodiments described above, but various modifications are possible without departing from the scope of the invention. For example, although the interpolation in the vertical direction is performed at the same time for all data on the same horizontal pixel line, the interpolation may also be performed for those data of pixels along a column in the vertical direction (corresponding to "one vertical pixel column" in claims) in a similar manner to the interpolation process in the horizontal direction described above in the first through fifth embodiments. More specifically, the interpolation may be performed in any one of the following three manners: the data for data storage locations in the vertical direction are each calculated from two original image data at locations vertically adjacent to the respective data storage locations; two original data at locations vertically adjacent to the corresponding data storage locations are alternately employed on a pixel by pixel basis in the vertical direction; or two original data at locations vertically adjacent to the corresponding data storage locations are alternately employed on a frame-by-frame basis.

Figure 11:
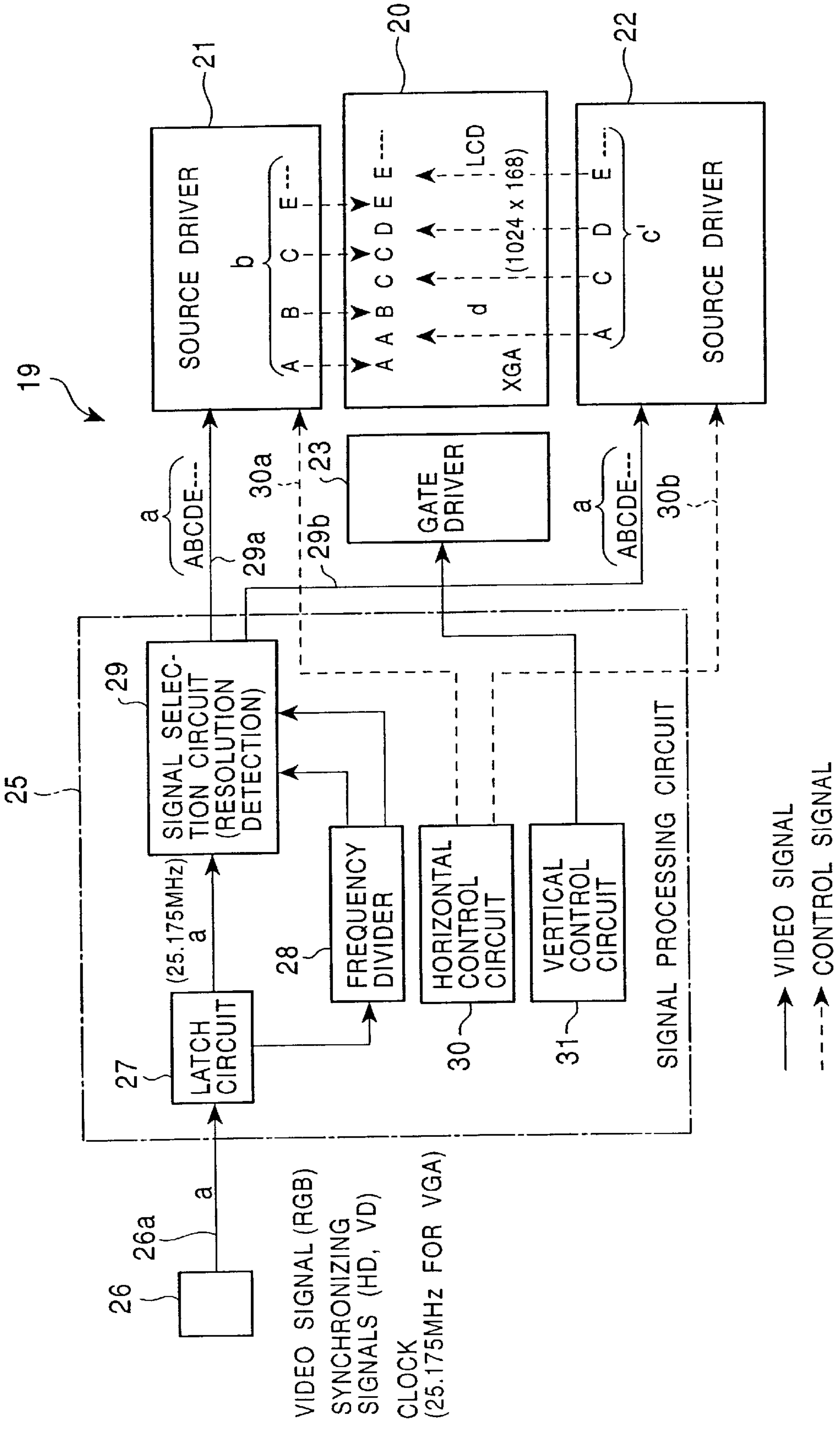
FIG. 11 is a circuit diagram illustrating a first embodiment of a driver circuit for use in an image display device, according to the present invention.

FIG. 11 illustrates a first embodiment of a driver circuit of an image display device, according to the present invention. In this embodiment, the resolution conversion/display device 19 mainly consists of an active matrix display panel (such as a liquid crystal display (LCD) panel) 20 in which source interconnection lines and gate interconnection lines are disposed in a matrix fashion and thin-film transistors are disposed also in an array fashion, first and second source drivers 21 and 22 connected to the source interconnection lines, a gate driver 23 connected to the gate interconnection lines, and a signal processing circuit 25 connected to the source and gate drivers. In this embodiment, it is assumed that the display panel 20 includes 1024 pixel in the horizontal direction and 768 pixels in the vertical direction according to the XGA standard.

In this structure according to the present embodiment, the first source driver 21 and the second source driver 22 are disposed at upper and lower sides, in FIG. 11, of the display panel 20 so that odd-numbered source interconnection lines extending in the vertical direction over the display panel 20 are connected to corresponding output terminals of the first source driver 21 thereby making it possible for the first source driver 21 to supply a signal over the odd-numbered source interconnection lines, and so that even-numbered source interconnection lines are connected to corresponding output terminals of the second source driver 22 thereby making it possible for the second source driver 22 to supply a signal over the even-numbered source interconnection lines of the display panel 20.

Thus, by combining the output of the first source driver 21 and the output of the second source driver 22, it is possible to drive the display panel 20 such that an image having a number of pixels well matched with the number of pixels of the display panel is displayed thereon.

The signal processing circuit 25 is designed to receive an image signal via a signal line 26*a* from an image signal generator 26 such as a personal computer wherein the signal processing circuit 25 includes a latch circuit 27, a frequency divider 28 and a signal selection circuit (resolution detecting circuit) 29 both connected to the latch circuit 27, a horizontal control circuit (horizontal image signal control circuit) 30 for controlling the source drivers 21 and 22, and a vertical control circuit (vertical image signal control circuit) 31 for controlling the gate driver 23.

The signal selection circuit 29 is connected to the source drivers 21 and 22 via image signal lines 29*a* and 29*b*, respectively, so that an image signal input to the signal selection circuit 29 is transmitted to the source drivers 21 and 22. The horizontal control circuit 30 is connected to the source drivers 21 and 22 via control lines 30*a* and 30*b*, respectively, so that the horizontal control circuit 30 transmits a set of sampling timing signals to the source drivers 21 and 22 thereby making the source drivers 21 and 22 generate horizontal image signals each having a smaller number of pixels in the horizontal direction than the number of pixels in the horizontal direction of the display panel 20 (1024 pixels in this specific example) which will be combined together into a horizontal image signal having the same number of pixels in the horizontal direction as the number of pixels of the display panel 20 (1024 pixels in this specific example).

Now, the operation of an image display device including a display panel 20 with a resolution according to the XGA standard (1024×768) is described below for the case where an XGA image signal (original data) is input and also for the case where a VGA image signal (640×480) is input.

Operation for Original Data According to the XGA Standard

If the signal processing circuit 25 receives original data (image signal) from the image signal generator 26 via the signal line 26*a*, the received original data is input to the latch circuit 27. The latch circuit 27 latches the original data and transfers it to the frequency divider 28 and the signal selection circuit 29. The frequency divider 28 divides the original data into two data, odd-numbered and even-numbered data, and sends them to the signal selection circuit 29. The signal selection circuit 29 analyzes the original data received from the latch circuit 27 and distinguishes the resolution thereof. In this specific example, the signal selection circuit 29 determines that the original data has a resolution according to the XGA standard. Furthermore, the signal selection circuit 29 selects data divided by the frequency divider 28 and sends the odd-numbered data to the first source driver 21 via the image signal line 29*a* and even-numbered data to the second source driver 22 via the image signal line 29*b*. The data sent to the source drivers 21 and 22 are directly input to the source interconnection lines of the display panel 20 thereby displaying the data according to the XGA standard on the display panel having the resolution according to the XGA standard without encountering any problems.

That is, in the case where the number of pixels in the horizontal direction of original data is equal to that of the display panel 20, after the original data is divided into two parts by the frequency divider 28 in the signal processing circuit 25, the resultant divided data are directly sent to the first source driver 21 and to the second source driver 22 thereby displaying an image on the display panel.

Operation for Original Data According to the VGA Standard

When original data has 640 pixels in the horizontal direction according to the VGA standard (that is, 1H=640), the process described below is required to accommodate the difference in resolution from the XGA display panel 20 having 1024 pixels in the horizontal direction (1H=1024).

When the signal processing circuit 25 receives original data, it is latched by the latch circuit 27. The latch circuit 27 then transfers the original data to the frequency divider 28 and the signal selection circuit 29. The signal selection circuit 29 analyzes the original data and, in this specific example, determines that the original data has a resolution according to the VGA standard. The signal selection circuit 29 generates two series of data which are absolutely identical to the original data (that is, the original data is copied), and the resultant two series of data are directly sent to the first and second source drivers 21 and 22 via the image signal lines 29*a* and 29*b*.

The data sent to the source drivers 21 and 22 are then sampled wherein the sampling timing is controlled by the horizontal control circuit 30.

Figure 12:
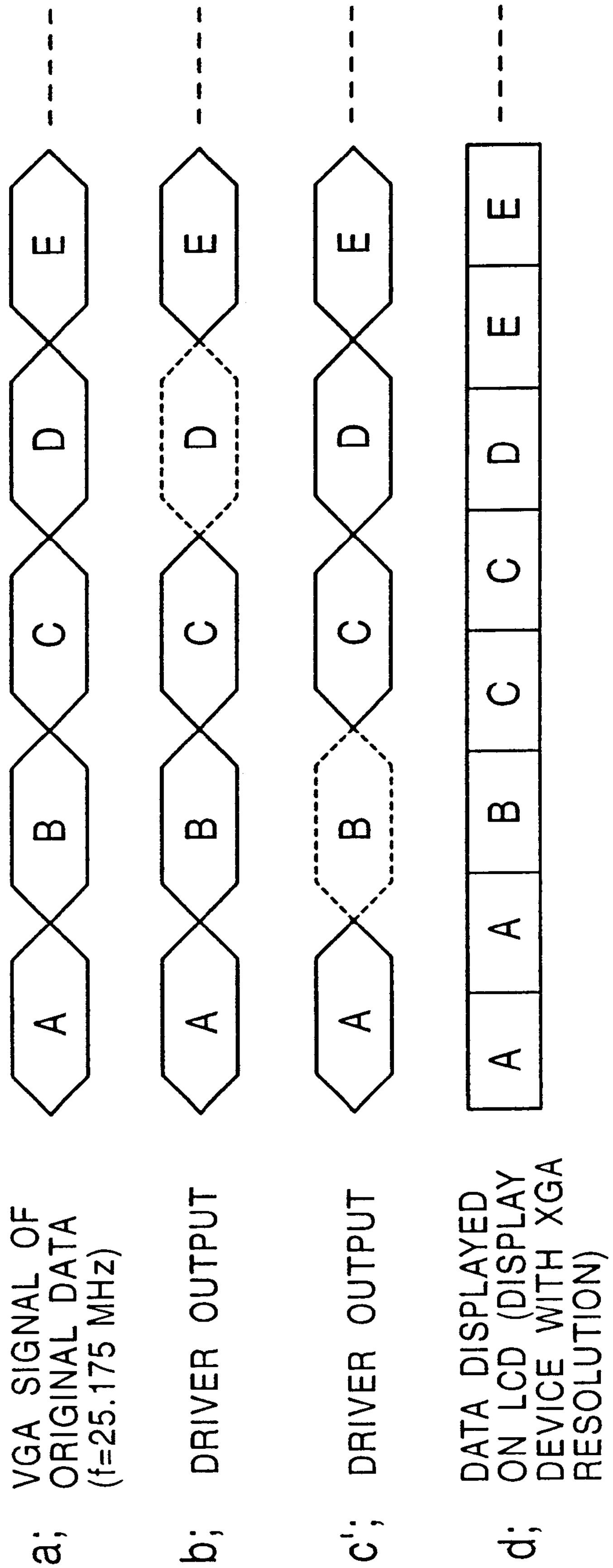
FIG. 12 is a signal output figure of circuit each part min at driving a circuit of enforcement form shown in FIG. 1.

For example, the horizontal control circuit 30 temporarily stops the clock signal to the source drivers 21 and 22 thereby removing some parts of the data input to the source drivers 21 and 22. The source drivers 21 and 22 generate partly removed data b and c', respectively, as shown in FIG. 12 (more specifically, the first source driver generates data b consisting of A, B, C, E, . . . without incorporating D therein, and the second source driver generates data c' consisting of A, C, D, E. . . . without incorporating B therein). These partly-removed data b and c' produced by means of sampling are output to the display panel 20. These data are combined together on the display panel 20 and, as a result thereof, data d is obtained (refer to FIG. 12).

Herein, the data removal ratio has to correspond to the resolution conversion ratio. For example, in order to obtain data with 1H=1024 by combining the two outputs from the source drivers 21 and 22, each driver has to output 512 data and thus each driver has to remove some parts of data so that data with 1H=640 is converted to data with 1H=512 (that is, data input to the respective source drivers 21 and 22 are reduced by 20%).

If the partly removed data b and c' are input to the display panel 20, these data b and c' are combined together on the display panel 20 and data d (AABCCDEE, . . . ) consisting of 1024 data per H is obtained. In this way, the number of pixels in the horizontal direction is increased by a factor of 1.6 and thus VGA data is converted to XGA data.

In the first embodiment of the driver circuit, as described above, by performing the signal processing in the manner described above with reference to FIG. 12 using the circuit shown in FIG. 11, it is possible to output data well matched with the resolution of the display panel without needing an additional clock generator which is required in conventional techniques. This makes a contribution to a reduction in the size of the circuit and also to a reduction in power consumption. Furthermore, the reliability of the display device is also improved.

Although in the above description, a VGA or XGA image signal is displayed on an XGA display device, the present invention may also be applied to various cases where image signals having various numbers of pixels in the horizontal direction are displayed on a display device according to any other standard such as SVGA, SXGA, or UXGA. In any case, it is possible to generate image data including an optimum number of pixels by partly removing data input to the source drivers 21 and 22 depending on the conversion ratio. That is, the invention may be applied to any conversion ratio associated with the number of pixels.

That is, regardless of whether a given image signal includes a smaller or greater number of pixels in the horizontal direction than the number of pixels in the horizontal direction of the display panel 20, a horizontal image signal whose number of pixels in the horizontal direction is well matched with that of the display panel 20 can be obtained by combining the outputs which are adjusted by controlling the sampling timing depending on the conversion ratio from the number of pixels in the horizontal direction of the input image signal to that of the display panel 20.

In this first embodiment, the process of displaying an image after converting the number of pixels of the original signal in the horizontal direction has been described. Now, conversion in the vertical direction is described below.

First Embodiment of Conversion/Display in the Vertical Direction

In this first embodiment, no conversion is performed in terms of the number of pixels in the vertical direction. Thus, a blank area can appear in the vertical direction.

In widely-used television sets with a horizontally-wide screen, an image is expanded only in the horizontal direction and the lower or upper area is treated as a blank area. The present invention incorporates this method into the above-described technique of converting the number of pixels in the horizontal direction so as to handle displaying in both horizontal and vertical directions while maintaining the advantage and features of the invention in terms of the small size achieved because of no need of an additional memory.

Second Embodiment of Conversion/Display in the Vertical Direction

A second method is to simultaneously drive a plurality of gates depending on the conversion ratio in terms of the number of pixels in the horizontal direction.

Figure 13A:
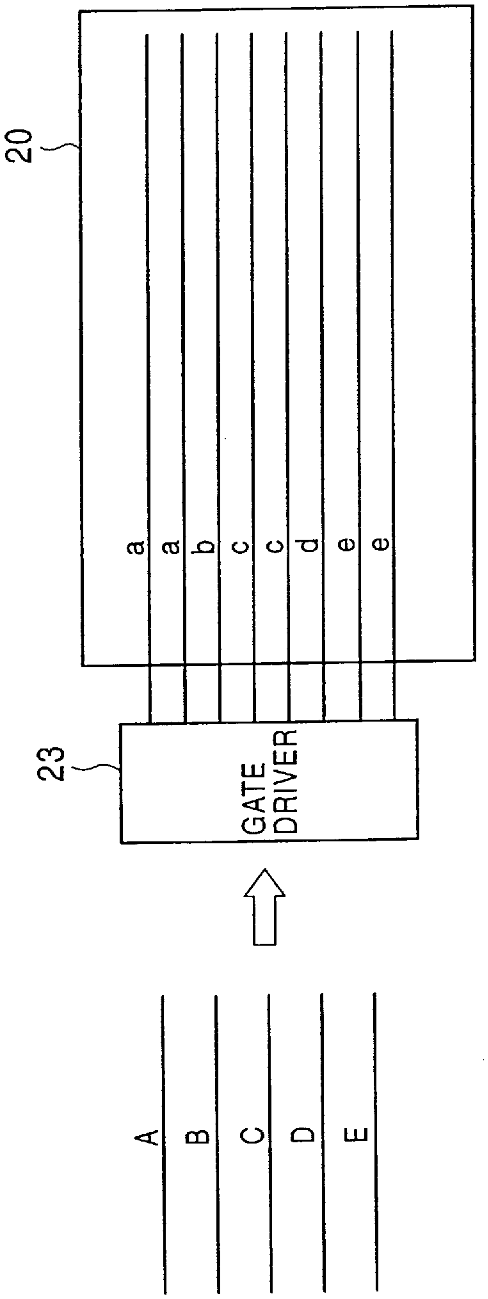
FIG. 13A schematically illustrates a first example of a vertical driving method and FIG. 13B schematically illustrates a second example.

For example, when the gate driver 23 shown in FIG. 13A is controlled, if the number of gate lines (gate interconnection lines) which are turned on during one horizontal scanning period is switched, then it becomes possible to expand the image in the vertical direction. The number of gate lines which are tuned on at the same time is switched depending on the conversion ratio.

For example, when a VGA image is converted to an XGA image, it is required to increase the number of lines by a factor of 1.6. That is, in FIG. 13A, it is required to convert information associated with five gate lines to information associated with eight gate lines. For example, when an original image signal including data A, B, C, D, and E is input as shown in FIG. 13A, the gate driver 23 outputs signals a, a, b, c, c, d, e, e over the gate lines.

That is, when five line data A, B, C, D, and E are given, data A, C, and E are written on two lines by simultaneously turning on two gate lines while the remaining data are written on one line so as to expand five-line data to eight-line data.

Figure 13B:
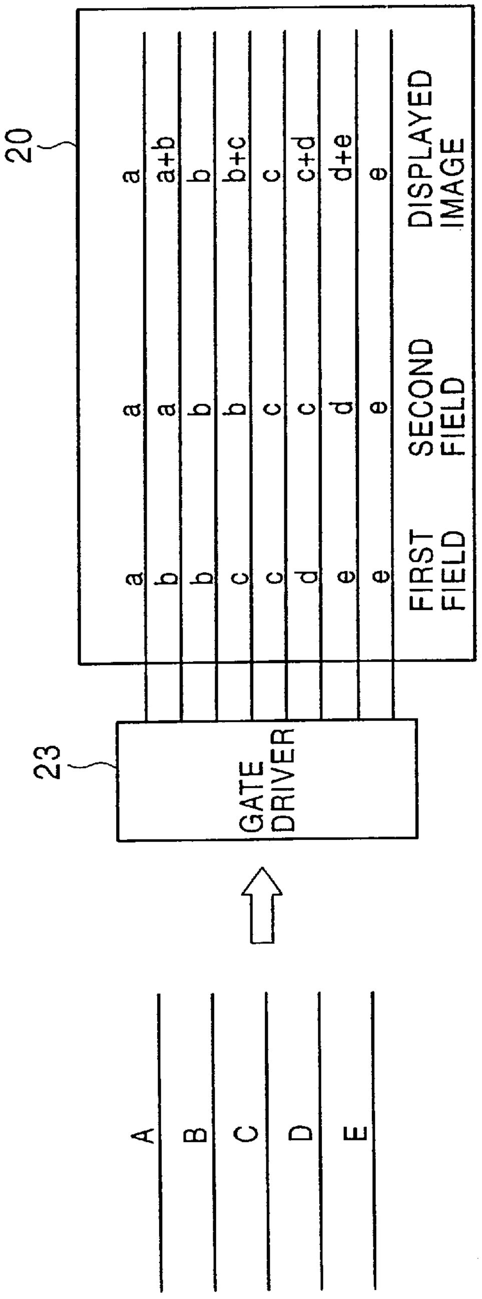

The locations on the screen which are turned on at the same time are switched field by field (or frame by frame) as shown in FIG. 13B, also as in the second embodiment which will be described later with reference to FIG. 15, thereby spatially averaging irregularities thus obtaining a smoothed image.

That is, it is possible to handle any resolution conversion ratio by controlling the number of gate lines which are turned on at the same time, depending on the conversion ratio. The vertical conversion method disclosed herein is also applicable to any embodiments which will be described later.

Figure 14:
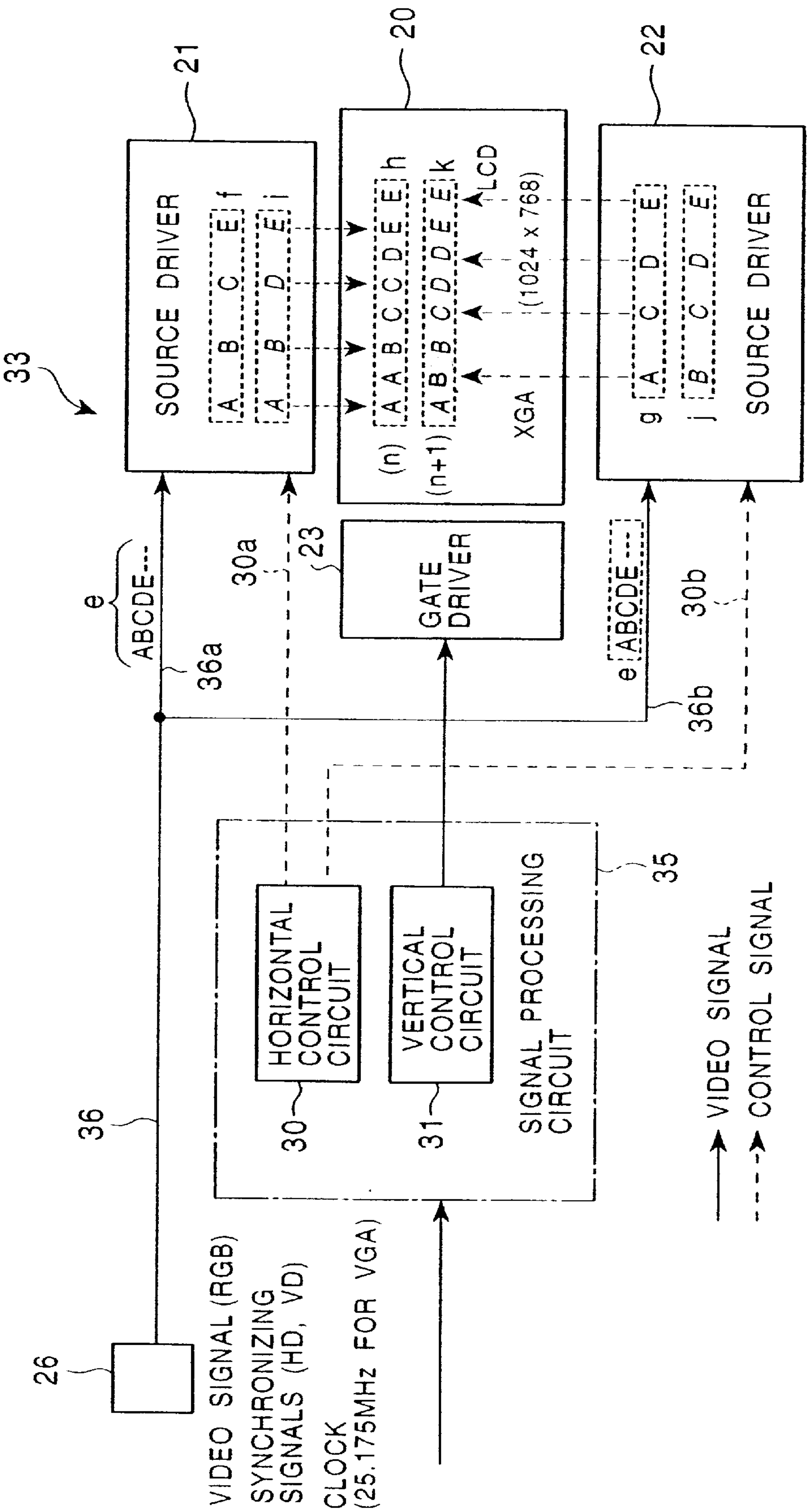
FIG. 14 is a circuit diagram illustrating a second embodiment of a driver circuit according to the present invention.

FIG. 14 illustrates a second embodiment of a driver circuit for use in an image display device, according to the present invention. In this embodiment, the resolution conversion/display device 33 includes an active matrix display panel (such as a liquid crystal display (LCD) panel) 20 in which source interconnection lines and gate interconnection lines are disposed in a matrix fashion and thin-film transistors are disposed also in an array fashion, first and second source drivers 21 and 22 connected to the source interconnection lines, a gate driver 23 connected to the gate interconnection lines, and a signal processing circuit 35 connected to the above circuits. In this embodiment, it is assumed that the display panel 20 includes 1024 pixel in the horizontal direction and 768 pixels in the vertical direction according to the XGA standard.

The signal processing circuit 35 is designed to receive an image signal generated by an image signal generator 26 such as a personal computer. The signal processing circuit 35 includes a horizontal control circuit (horizontal image signal control circuit) 30 for controlling the source drivers 21 and 22, and a vertical control circuit (vertical image signal control circuit) 31 for controlling the gate driver 23.

In this embodiment, the first source driver 21, the second source driver 22 and the gate driver 23 are similar to those employed in the previous embodiment. However, unlike the previous embodiment, an image signal (original data) output from the image signal generator is directly input to the source drivers 21 and 22 via image signal lines 36*a* and 36*b* branching from an image signal line 36.

The horizontal control circuit 30 is connected to the source drivers 21 and 22 via control lines 30*a* and 30*b*, respectively, so that a pair of sampling timing signals are sent to the source drivers 21 and 22, respectively, thereby making the source drivers 21 and 22 sequentially generate horizontal image signals (on a field-by-field basis) each having a smaller number of pixels in the horizontal direction than the number of pixels in the horizontal direction included in the display panel 20 (the number of pixels in the horizontal direction of the display panel 20 is equal to 1024 in this specific embodiment) such that an image signal having the same number of pixels in the horizontal direction as the number of pixels in the horizontal direction of the display panel 20 is obtained when the horizontal image signals output from the respective source drivers 21 and 22 are combined together.

Operation for the Case Where an Original Data is Based on a Standard Smaller Than the XGA Standard When given original data has 640 pixels in the horizontal direction, as is the case for data according to the VGA standard (with 1H=640), the process described below is required to accommodate the difference in resolution between the original data and the display panel 20 having 1024 pixels in the horizontal direction according to the XGA standard (1H=1024).

First, the original data is directly sent to both source drivers 21 and 22 via signal lines 36*a* and 36*b*. The source drivers 21 and 22 partly remove the received data by controlling the sampling process on the digital data. Herein, the sampling process is controlled by the horizontal control circuit 30 such that the source drivers 21 and 22 temporarily stop the sampling operation so as to remove some part of the data input to the respective source drivers wherein the part which is removed from the data is switched line by line. The partly removed data are then supplied to the display panel 20.

Figure 15:
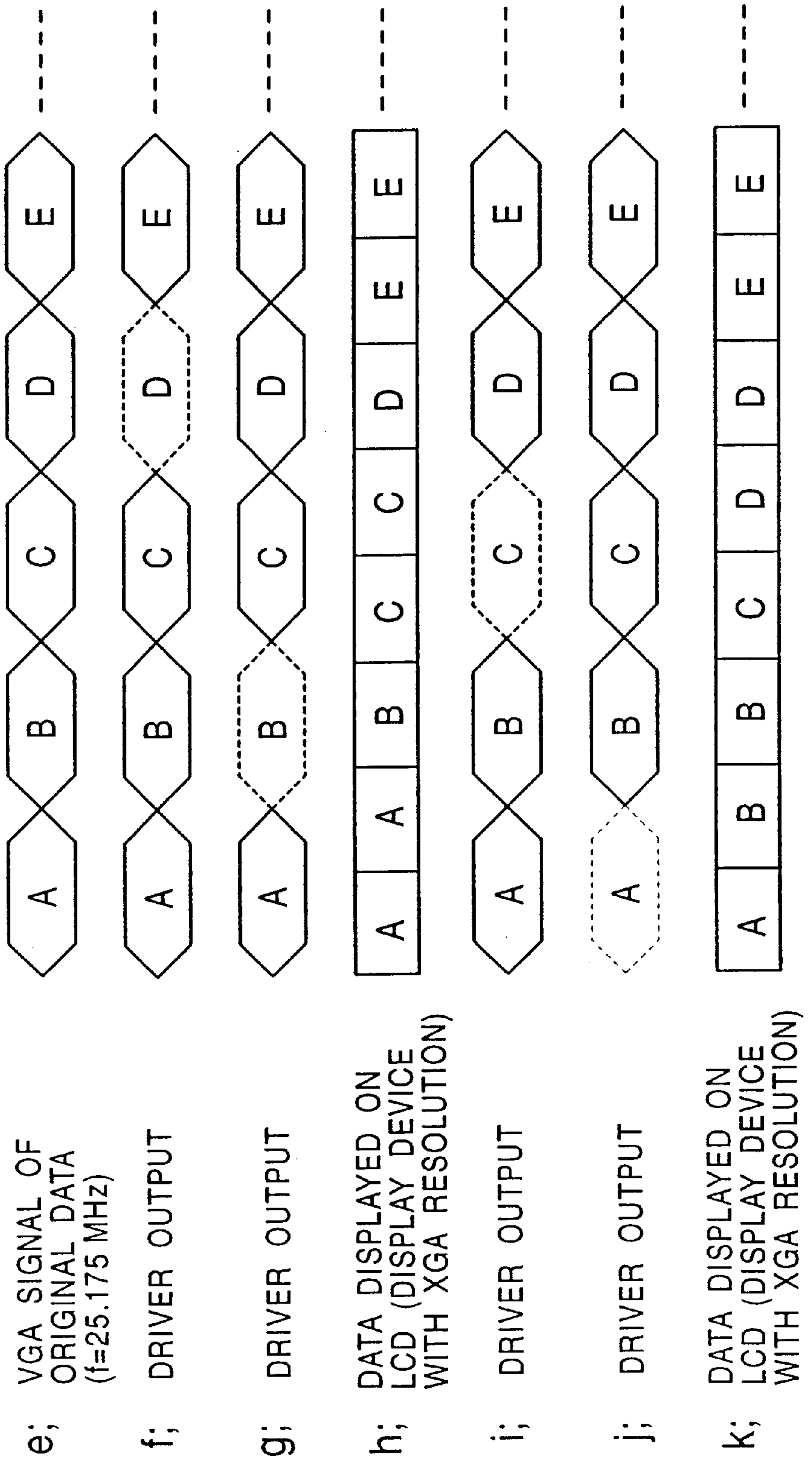
FIG. 15 schematically illustrates signals output at various parts of the driver circuit shown in FIG. 14 according to the second embodiment of the invention.

In FIG. 15, an nth output from the source driver 21 is denoted by f and an nth output from the source driver 22 is denoted by g. These outputs are combined together, and a resultant signal h is displayed on the liquid crystal display panel 20 as shown in FIG. 15.

Then (n+1)th outputs i and j are provided from the source drivers 21 and 22, respectively, as shown in FIG. 15. These outputs are combined together and a resultant signal k is displayed on the liquid crystal display panel 20 as shown in FIG. 15.

In this case, as described above, data is partly removed by the source drivers 21 and 22 wherein the removed part is varied line by line, and the resultant data is output to the display panel 20.

Operation for the Case Where an Original Data is Based on the XGA Standard

In this case, the original data is directly sent to both source drivers 21 and 22 via signal lines 36*a* and 3*b*, and the source drivers 21 and 22 perform sampling the received digital data such that only a half of the original digital data are sampled thereby reducing the data. The resultant partly removed data are directly output to the display panel 20 so as to display an XGA image on the liquid crystal panel 20.

The data removal ratio has to correspond to the resolution conversion ratio. For example, in order to obtain data with 1H=1024 by combining the two outputs from the source drivers 21 and 22, each driver has to output 512 data and thus each driver has to remove a half of the data so that data with 1H=1024 is converted to data with 1H=512 (that is, data input to the respective source drivers 21 and 22 are reduced by 50%).

In the second, as described above, by performing the signal processing in the manner described above with reference to FIG. 15 using the circuit shown in FIG. 14, it is possible to output data well matched with the resolution of the display panel without needing an additional clock generator which is required in conventional techniques. This makes a contribution to a reduction in the size of the circuit and also to a reduction in power consumption. Furthermore, the reliability of the display device is also improved.

Furthermore, because the locations where data is removed are changed every vertical line so as to obtain an spatially integrated image thereby averaging the removed data over the entire screen thus obtaining a smoothed image similar to the original image. Furthermore, the spatial frequency increases and, as a result, flicker decreases.

Figure 16:
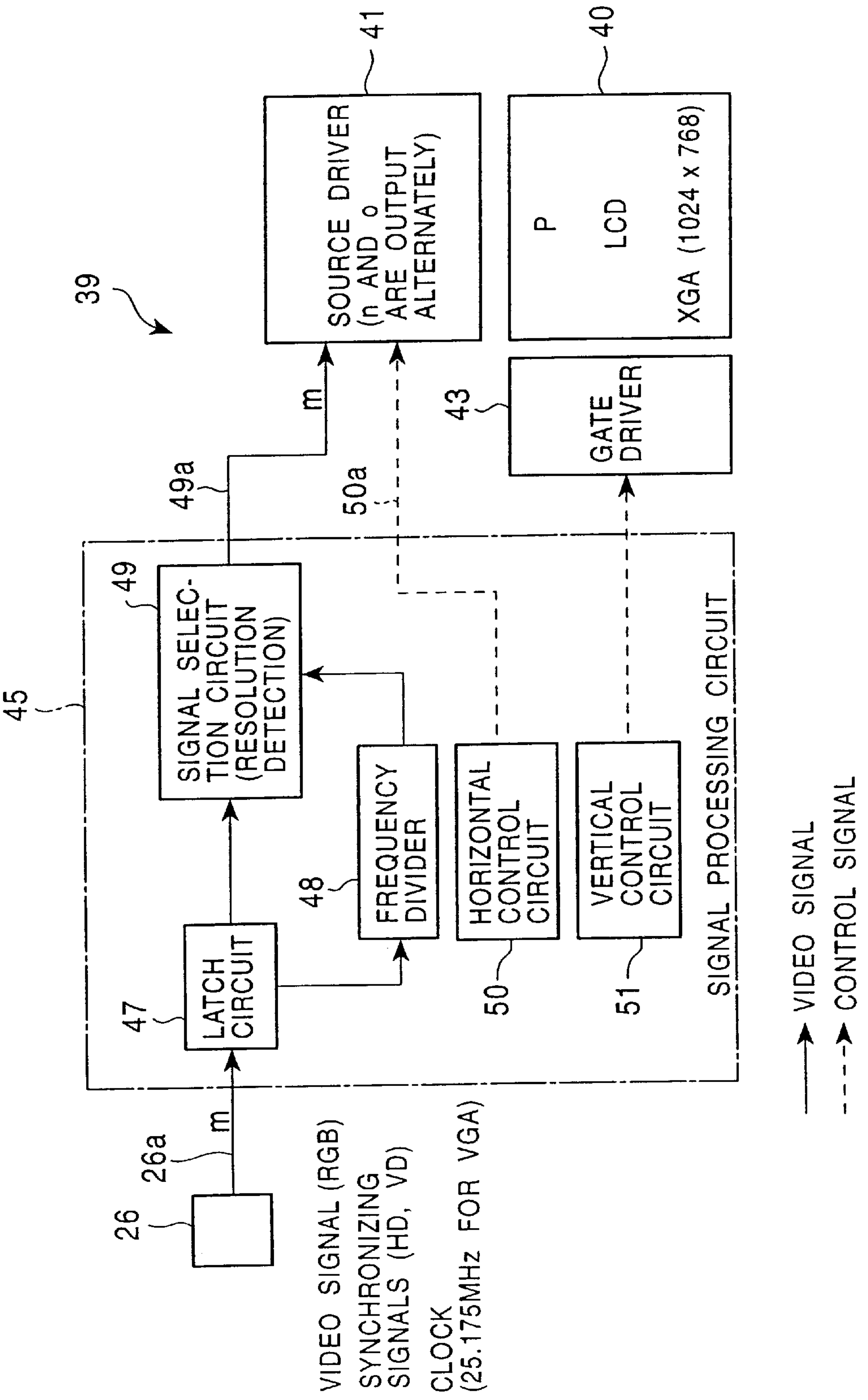
FIG. 16 a circuit diagram illustrating a third embodiment of a driver circuit according to the present invention.
Figure 17:
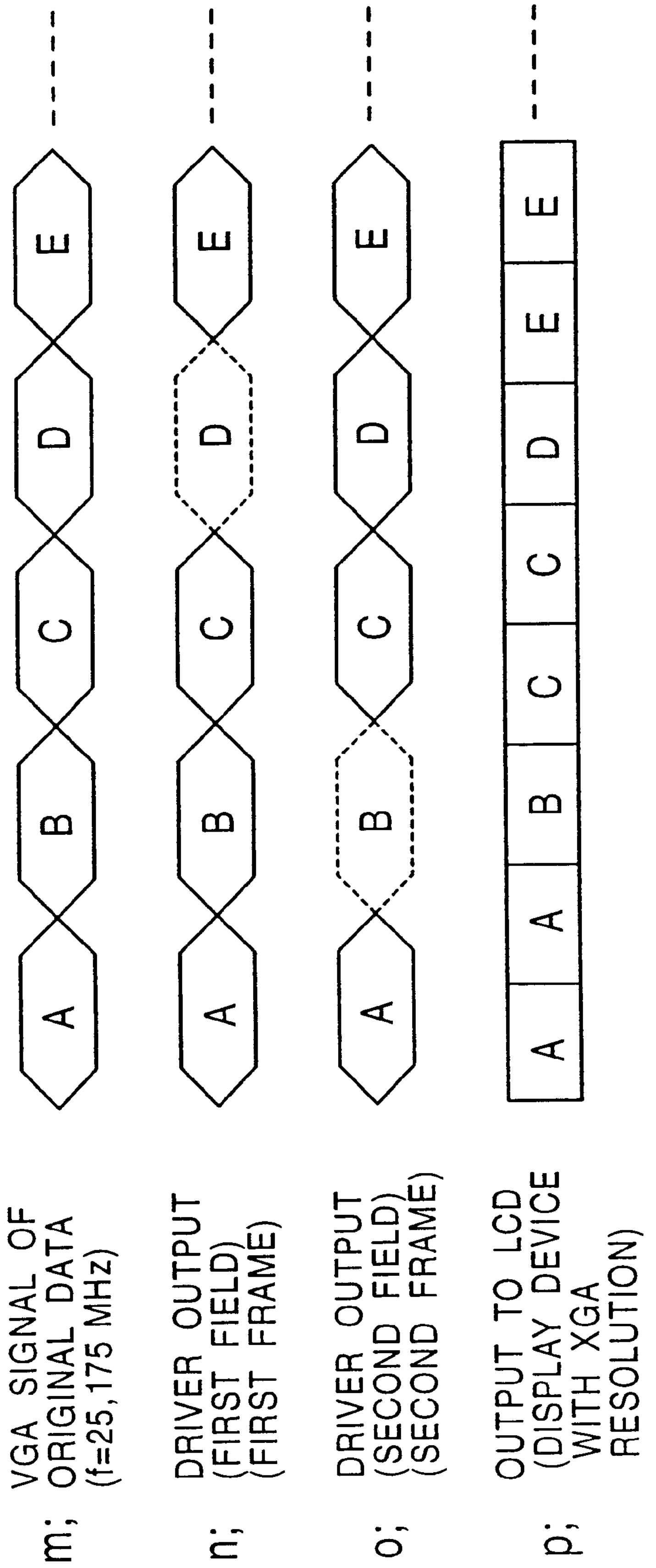
FIG. 17 schematically illustrates signals output at various parts of the driver circuit shown in FIG. 16 according to the third embodiment of the invention.

FIGS. 16 and 17 illustrate a third embodiment of a driver circuit for use in an image display device, according to the present invention. Herein, a display panel 40 with the XGA resolution (1024×768) is employed. The driver circuit includes a source driver 41 according to the VGA standard (640×480), a gate driver 43, a signal processing circuit 45, a latch circuit 47, a frequency divider 48, a signal selection circuit (resolution detecting circuit) 49, a horizontal control circuit (horizontal image signal control circuit) 50, a vertical control circuit (vertical image signal control circuit) 51, an image signal line 49*a*, and a control line 50*a*.

Figure 18:
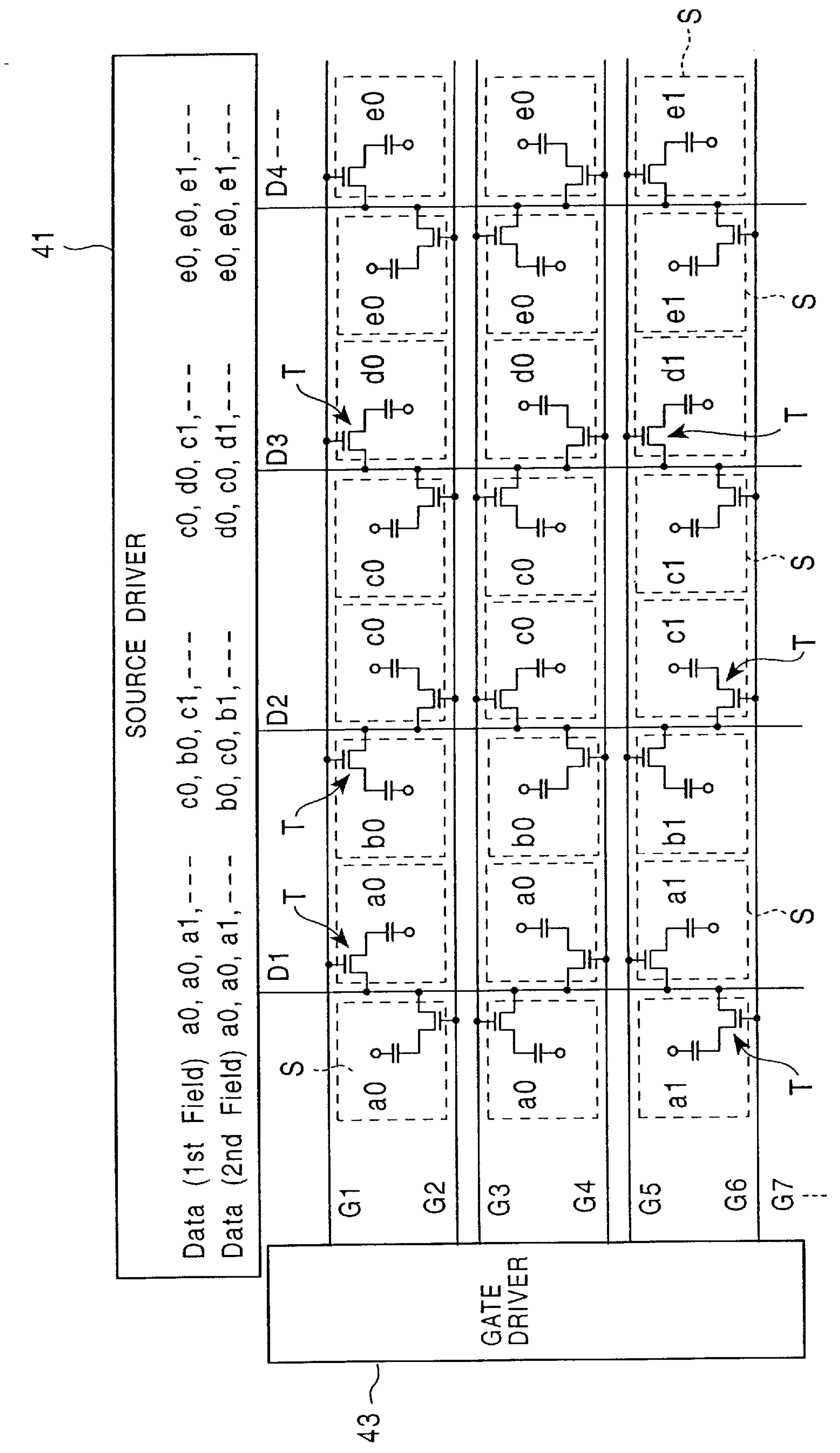
FIG. 18 schematically illustrates a first example of the circuit configuration of a liquid crystal display panel substrate suitable for use in the driver circuit according to the third embodiment of the invention.
Figure 19:
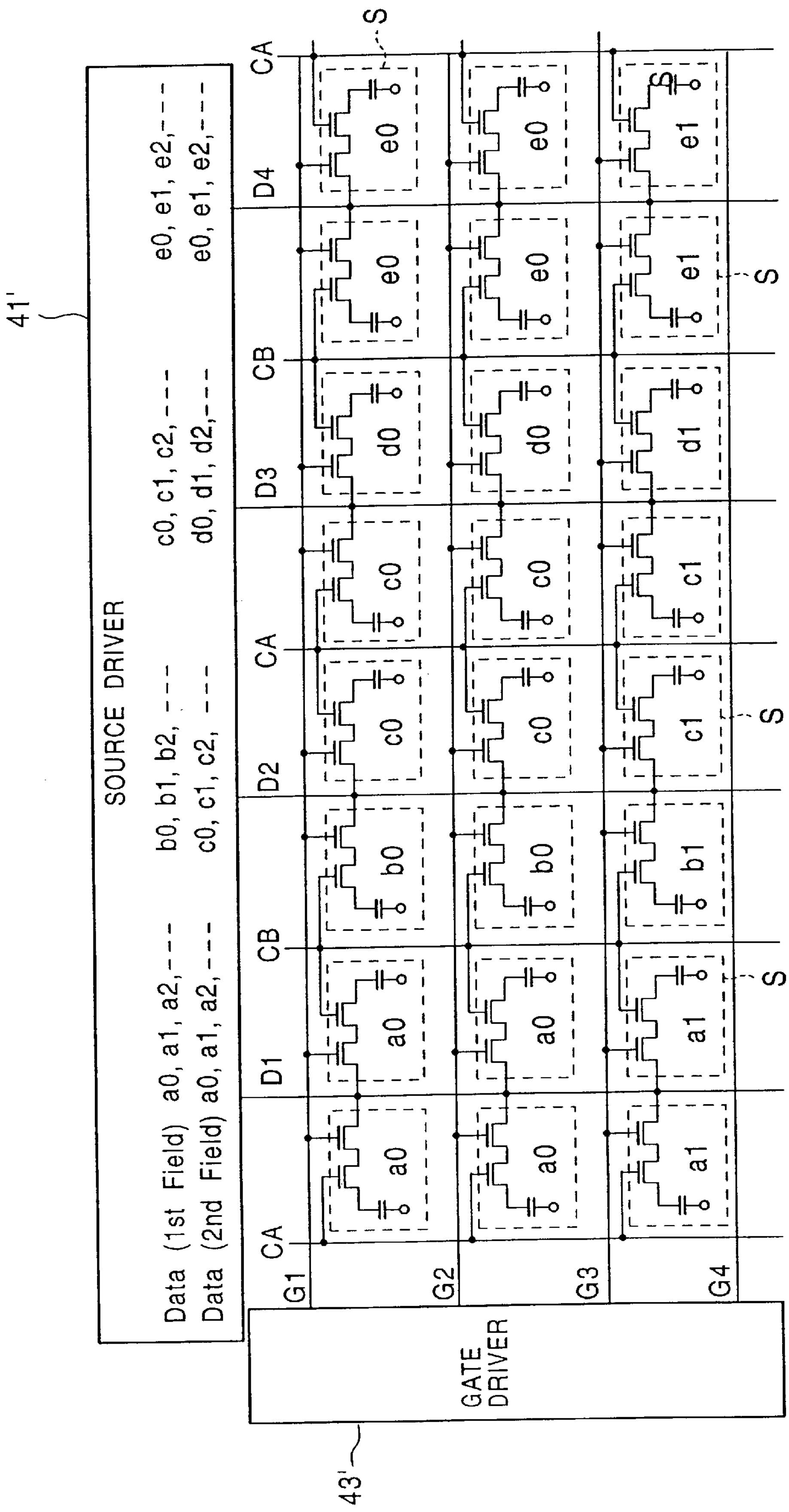
FIG. 19 schematically illustrates a second example of the circuit configuration of a liquid crystal display panel substrate suitable for use in the driver circuit according to the third embodiment of the invention.

FIGS. 18 and 19 illustrates examples of liquid crystal display devices which may be preferably employed as a display panel according to the second embodiment of the invention.

This circuit configuration can be used to display an image originally according to the XGA or VGA standard on a display panel having a resolution according to the XGA standard (1H=1024) coupled to a source driver capable of handling a signal according to the VGA standard including 1H 640 pixels which is about a half the number of pixels according to the XGA standard.

In this embodiment, the source driver 41 capable of outputting a VGA image is employed to drive a display panel which is constructed in such a manner as will be described later with reference to FIG. 18 or FIG. 19.

Operation for the Case Where an XGA Data is Input

If the signal processing circuit 45 receives original data (image signal) from the image signal generator 26 via the signal line 26*a*, the received original data is input to the latch circuit 47. The latch circuit 47 latches the original data and transfers it to the frequency divider 48 and also to the signal selection circuit 49. The frequency divider 48 removes one original data every two data so as to reduce the number of data to a half the original number. The resultant reduced data is sent to the signal selection circuit 49. In the above process, the removed data are switched frame by frame.

The signal selection circuit 49 analyzes the original data received from the latch circuit 47 and, in this specific example, determines that the original data has a resolution according to the XGA standard. Furthermore, the signal selection circuit 49 selects data divided by the frequency divider 48 and sends the selected data to the source driver 41 via the image signal line 49*a*. The source driver 41 directly outputs the received data to the display panel 40.

As described above, when the source driver 41 designed to handle VGA data is coupled to the display panel 40 designed to display XGA data, if original data according to the XGA standard is input, it is possible to display the XGA image on the display panel by processing the data in the above-described manner without encountering any problem.

Before further describing the processing performed on a VGA signal, an example of the display panel 40 suitable for use with the circuit according to the second embodiment is described.

FIG. 18 illustrates an example of the circuit configuration of an active matrix liquid crystal display panel substrate suitable for use with the circuit according to the second embodiment. In this circuit configuration, source interconnection lines D1, D2, D3, D4, . . . are connected to respective output terminals of a source driver 41 and gate interconnection lines G1, G2, G3, G4, G5, G6, G7, . . . are connected to respective output terminals of a gate driver 43. Furthermore, one or two pixel electrodes S are formed in each area surrounded by source and gate interconnection lines wherein the area corresponding to each pixel electrode S serves as a display area.

In this structure, the gate interconnection lines G1, G2, G3, G4, G5, G6, . . . , are disposed such that two lines are closely adjacent to each other except for the top and bottom lines. There are also provided switching elements such as thin-film transistors T each connected to a corresponding pixel electrode S, a corresponding source interconnection line, and a corresponding gate interconnection line. Each source interconnection line D is connected via switching elements T to pixel electrodes S disposed along two columns at right and left sides of that source interconnection line. The respective pixel electrodes S disposed at right and left sides of each source interconnection line D are connected via switching elements T to different gate interconnection lines G.

Figure 20:
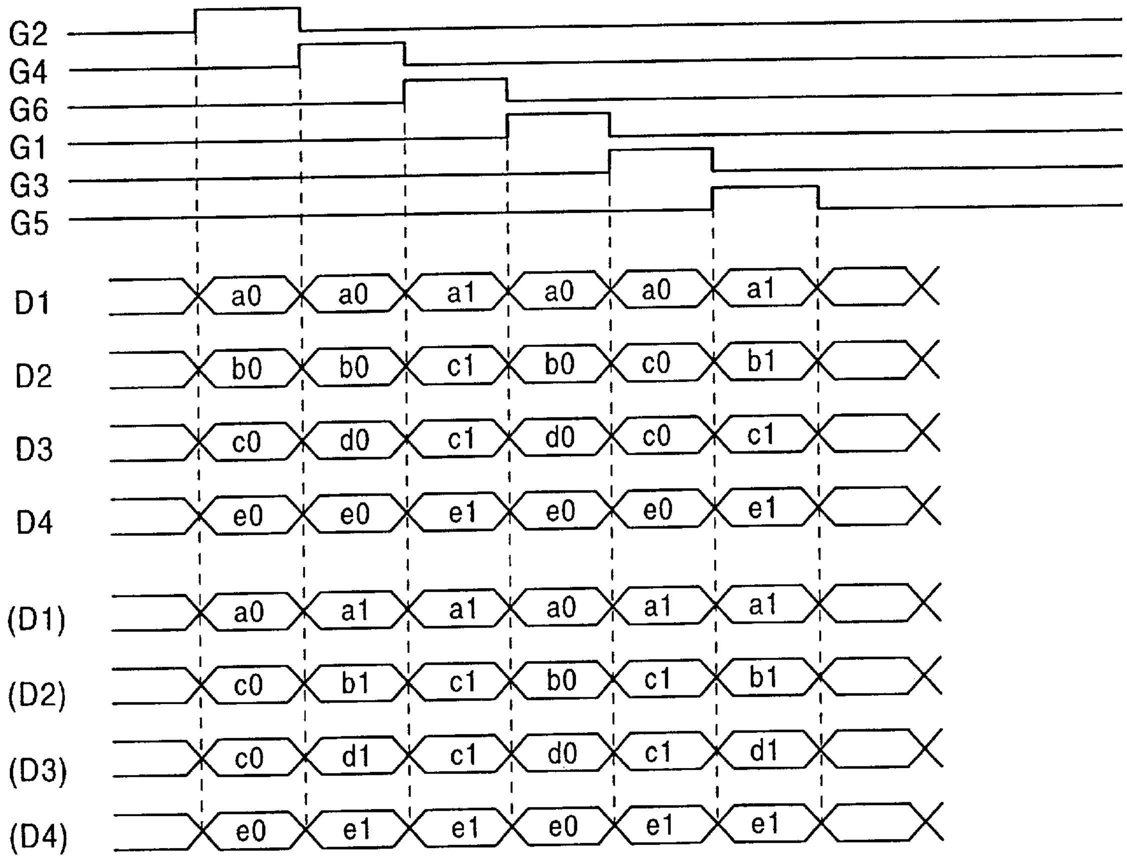
FIG. 20 schematically illustrates a first example of timing among various signals for driving the display panel having the circuit configuration shown in FIG. 18 according to the third embodiment of the invention.

The display panel constructed in the above-described manner is driven by operating switching elements T connected to even-numbered gate interconnection lines G2, G4, G6, . . . such that these switching elements T are turned on sequentially in the order G2, G4, G6, . . . in a first field as shown in the timing chart of FIG. 20. In the second field, switching elements T connected to odd-numbered gate interconnection lines G1, G3, G5, . . . are turned on sequentially in the order G1, G3, G5, . . .

By operating the gate driver 43 in the above-described manner, it is possible to switch, field by field, the locations where data transmitted from the source driver 41 are written thereby displaying an image originally according to the VGA standard on the display panel 40 according to the XGA standard, as described above with reference to FIG. 16.

In the circuit configuration shown in FIG. 18, each source interconnection line is connected via switching elements T to pixel electrodes S disposed along two columns at right and left sides of that source interconnection line. Therefore, by controlling the switching elements using the gate driver 43, it is possible to switch, frame by frame, the locations where data transmitted to the source driver are written.

FIG. 19 illustrates another example of the circuit configuration of an active matrix liquid crystal display panel substrate suitable for use with the circuit according to the second embodiment. In this circuit configuration, source interconnection lines D1, D2, D3, D4, . . . are connected to respective output terminals of a source driver 41' and gate interconnection lines G1, G2, G3, G4, G5, G6, . . . are connected to respective output terminals of a gate driver 43'. Control interconnection lines CA are formed at locations adjacent to odd-numbered source interconnection lines D1, D3, D5, . . . such that they extend in a direction parallel to the source interconnection lines D1, D2, D3, D4, . . . Similarly, control interconnection lines CB are formed at locations adjacent to even-numbered source interconnection lines D2, D4, D6, . . . Furthermore, one pixel electrode S is formed in each area surrounded by one source interconnection line D, two gate interconnection lines G, and one control interconnection line CA or CB wherein the area corresponding to each pixel electrode S serves as a display area.

In this structure, the gate interconnection lines G1, G2, G3, G4, G5, G6, . . . are substantially equally spaced from each other and the respective pixel electrodes S are located between the adjacent two gate interconnection lines. Furthermore, pixel electrodes S are disposed such that they extend along columns at right and left sides of each source interconnection lines D1, D2, D3, D4, . . . Two switching elements T such as thin-film transistors are disposed adjacent to each pixel electrode S such that they are connected to that pixel electrode S, one source interconnection line or one gate interconnection line.

More specifically, each source interconnection line D is connected via corresponding switching elements T to pixel electrodes S disposed along columns at right and left sides of that source interconnection line D wherein the switching element T which is closer to the source interconnection line D is connected to that source interconnection line D and the other switching element T is connected to the control line C adjacent to the pixel electrode S.

Figure 21:
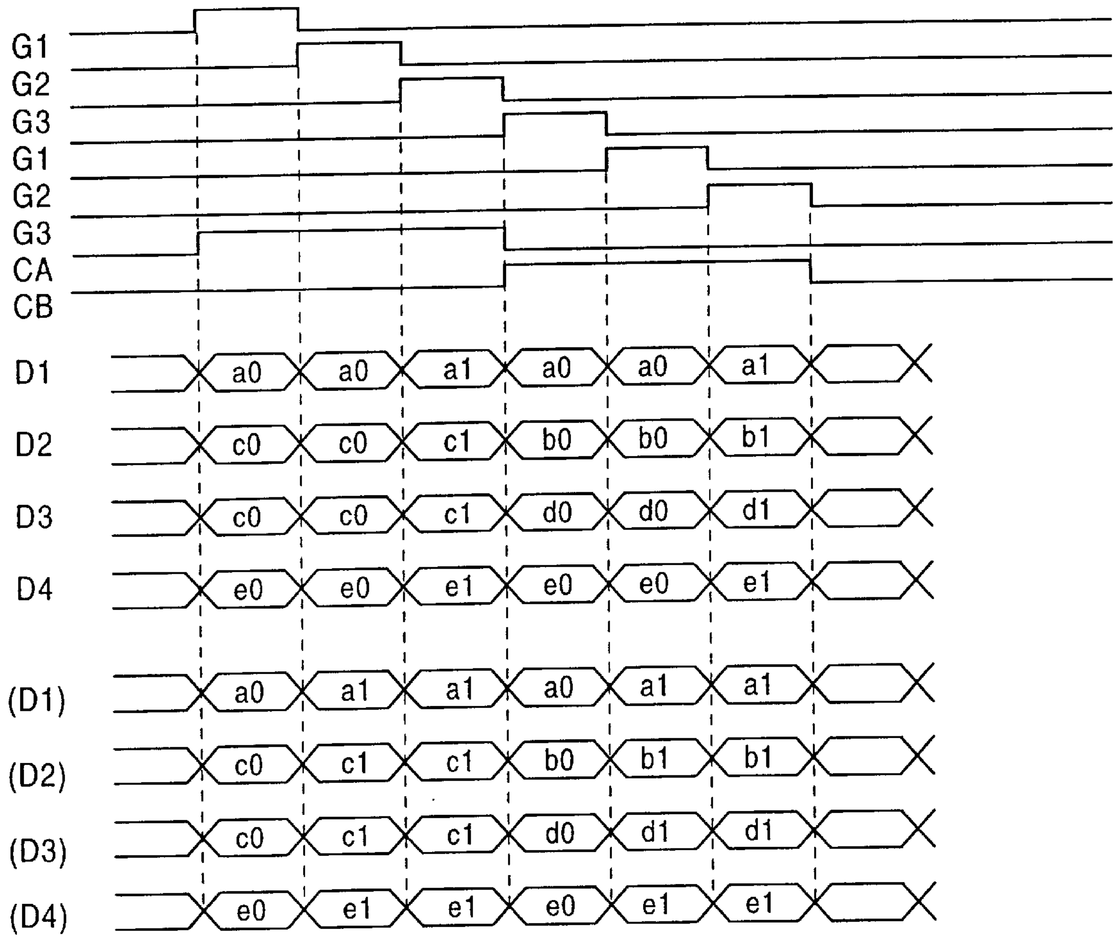
FIG. 21 schematically illustrates a second example of timing among various signals for driving the display panel having the circuit configuration shown in FIG. 28 according to the third embodiment of the invention.
Figure 22:
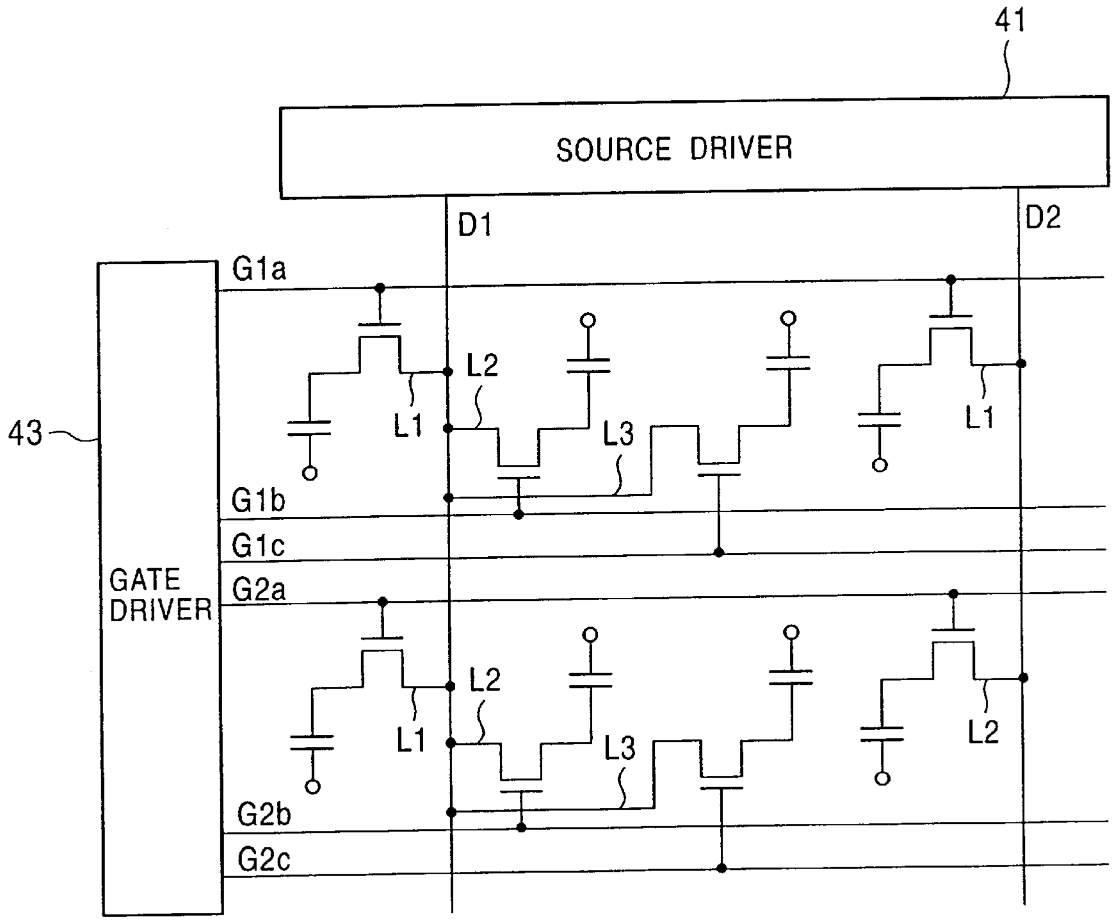
FIG. 22 a circuit diagram illustrating a fourth embodiment of a driver circuit according to the present invention.

The display panel constructed in the above-described manner is driven as follows. In a first field, the gate interconnection lines are activated in the order G1, G2, G3, . . . as shown in the timing chart of FIG. 21 and the control lines CA and CB are set to high and low levels, respectively, so as to turn on the switching elements T connected to the control line CA. Then in the second field, the gate interconnection lines are activated in the order G1, G2, G3, . . . and the control lines CB and CA are set to high and low levels, respectively, so that the switching elements T connected to the control lines CB are turned on.

By performing the operation on the source driver 41' and the control lines CA and CB in the above-described manner, it is possible to switch, field by field, the locations where data transmitted from the source driver 41' are written.

In the circuit configuration shown in FIG. 19, each source interconnection line is connected via switching elements T to pixel electrodes S disposed along two columns at right and left sides of that source interconnection line. Therefore, by controlling the switching elements using the gate driver 43', it is possible to switch, frame by frame, the locations where data transmitted to the source driver are written.

Operation for VGA Data

As shown in FIG. 16, when the signal processing circuit 45 receives original data from the image signal generator 26, the original data is latched by the latch circuit 47. The latch circuit 47 then transfers the original data to the frequency divider 48 and also to the signal selection circuit 49. The signal selection circuit 49 analyzes the original data and, in this specific example, determines that the original data has a resolution according to the VGA standard. The signal selection circuit 49 select data received from the latch circuit 47 and sends the selected data to the source driver 41. The source driver 41 samples the received data with properly-controlled timing.

The sampling timing can be controlled for example by temporarily stopping the clock signal to the source driver 41 so as to partly remove data. The removed data are switched from a first field to a second field as is the case with data n and o shown in FIG. 17.

The partly removed data are then output to the display panel 40.

Herein, the display panel 40 is configured in the manner described above with reference to FIG. 18 or 19. That is, each source interconnection line is connected via switching elements T to pixel electrodes S disposed along two columns at right and left sides of that source interconnection line. Therefore, by controlling the switching elements using the gate driver 43 or 43', it is possible to switch, frame by frame, the locations where data transmitted to the source driver 41 or 41' are written.

As a result, the output signal includes 1024 data per horizontal line. Thus, the number of pixels has been increased by a factor of 1.6. That is, it is possible to convert an image signal having a number of pixels according to the VGA standard to an image signal having a number of pixels according to the XGA standard.

In the present embodiment, when the source driver is capable of operating at a clock frequency corresponding to the maximum resolution of the display panel 40 (65 MHz or 75 MHz when the XGA standard is employed), the signal processing circuit 45 does not need the frequency divider 48.

In the third embodiment, by performing the signal processing in the manner described above with reference to FIG. 17 using the device constructed in the manner described above with reference to FIGS. 16 and 18, it is possible to output an image with a resolution well matched with the resolution of the display panel without requiring an additional clock generator which is required in conventional techniques. This makes a contribution to a reduction in the size of the circuit and also to a reduction in power consumption. Furthermore, the reliability of the display device is also improved.

Furthermore, if the signal which is removed is changed field by field or frame by frame such that the locations where data is removed are scattered over the whole screen, then it becomes possible to obtain an image more similar to the original image.

In the internal structure of the display panel 40 according to the third embodiment described above, each source interconnection line Dn (D1, D2, D3, . . . ) may have extension lines (L1, L2, L3) so that a signal is supplied to three pixel electrodes S via these extension lines. In this case, there may be provided three gate interconnection lines (G1*a*, G1*b*, G1*c*, G2*a*, G2*b*, G3*c*, . . . ) for each horizontal pixel line so that a signal can be supplied for three different fields.

This configuration makes it possible to perform conversion in terms of the number of pixels in the horizontal direction using a further simplified source driver. In this case, the given signal is also partly removed depending on the conversion ratio in terms of the number of pixels, as in the previous cases.

Figure 23:
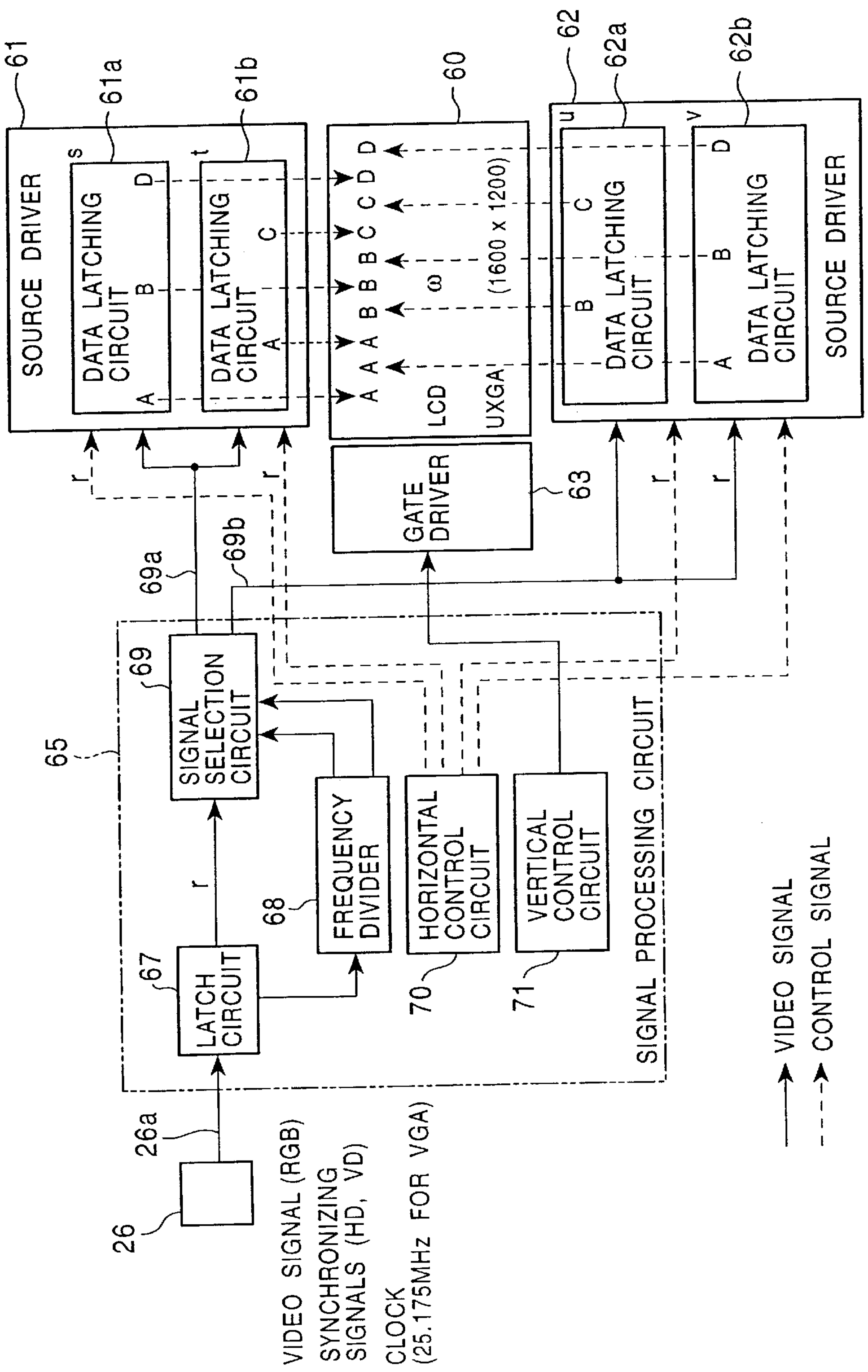
FIG. 23 a circuit diagram illustrating a fifth embodiment of a driver circuit according to the present invention.
Figure 24:
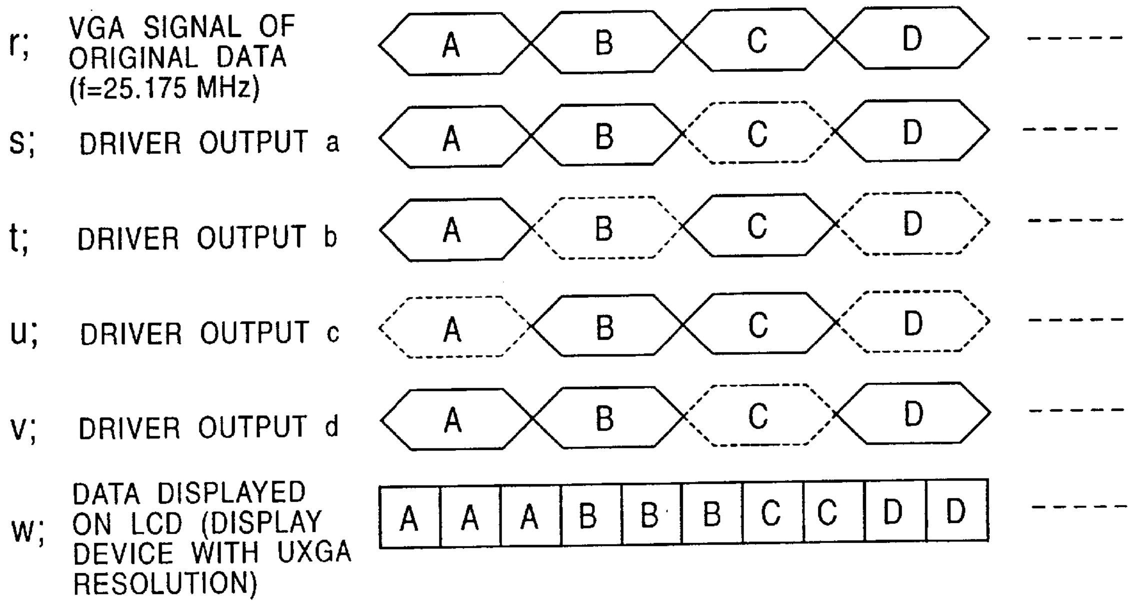
FIG. 24 schematically illustrates signals output at various parts of the driver circuit shown in FIG. 23 according to the fifth embodiment of the invention.

FIGS. 23 and 24 illustrate a fifth embodiment of a driver circuit according to the present invention. In the present embodiment, a display panel 60 with the UXGA resolution (1600×1200 pixels) is employed. The driver circuit includes a source driver 61 according to the UXGA standard, a gate driver 63, a signal processing circuit 65, a latch circuit 67, a frequency divider 68, a signal selection circuit (resolution detecting circuit) 69, a horizontal control circuit (horizontal image signal control circuit) 70, and a vertical control circuit (vertical image signal control circuit) 71.

The source driver 61 includes data latch circuits 61*a* and 61*b* and the source driver 62 includes data latch circuits 62*a* and 62*b* whereby signals are supplied to the odd-numbered source interconnection lines alternately from the data latch circuits 61*a* and 61*b* and signals are supplied to the even-numbered source interconnection lines alternately from the data latch circuits 62*a* and 62*b*. This circuit configuration can be used to display an image originally according to for example the UXGA or VGA standard on a display panel having a resolution according to the UXGA standard coupled to a source driver capable of handling a signal with 1H=1600 data according to the UXGA standard.

Operation for UXGA Data

If the signal processing circuit 65 receives original data (image signal) from the image signal generator 26, the received original data is latched by the latch circuit 67. The latch circuit 67 transfers the latched data to the frequency divider 68 and also to the signal selection circuit 69. The frequency divider 68 divides the original data into two data, odd-numbered and even-numbered data, and sends them to the signal selection circuit 69. The signal selection circuit 69 analyzes the original data received from the latch circuit 67 and, in this specific example, determines that the original data has a resolution according to the UXGA standard (1H=1600). The signal selection circuit 69 selects data divided by the frequency divider 68 and sends the selected data to both source drivers 61 and 62 via the image signal lines 69*a* and 69*b*, respectively. That is, absolutely identical data are supplied to the source drivers 61 and 62. When the source driver 61 or 62 receives the data, it is input to either the data latch circuit 61*a* or 61*b*, or either 62*a* or 62*b*. The data input to the data latch circuits are directly displayed on the display panel 60 and thus UXGA data can be displayed on the UXGA display panel without having any problem.

Operation for VGA Data

If the signal processing circuit 65 receives original data (image signal) from the image signal generator 26, the received original data is input to the latch circuit 67. The latch circuit 67 transfers the latched data to the frequency divider 68 and also to the signal selection circuit 69. The signal selection circuit 69 analyzes the original data and, in this specific example, determines that the original data has a resolution according to the VGA standard (1H=640). Two series of data each absolutely identical to the original data transmitted from the latch circuit 67 are produced and directly supplied to two source drivers 61 and 62. The data sent to the source drivers 61 and 62 are then sampled wherein the sampling timing is controlled in a proper fashion. The sampling timing is controlled for example by temporarily stopping the clock signals to the source drivers 61 and 62 thereby partly removing data.

The above-described sampling timing is performed separately for the respective data latch circuits 61*a*, 61*b*, 62*a*, and 62*b* of the drivers 61 and 62. The sampled and partly removed data are output to the display panel 60. The resultant data includes 1600 data per horizontal pixel line. In this case, because the image is converted from the VGA format (640 pixels) to the UXGA format (1600 pixels), the image is expanded by a factor of 2.5. Each data latch circuit converts a signal including 640 pixels to a signal including 400 pixels. Because each data latch circuit generates a signal with 400 pixels via the above signal reduction process, the overall signal obtained by combining the outputs of the four data latch circuits include 400×4=1600 pixels. In FIG. 24, the outputs of the respective data latch circuits 61*a*, 61*b*, 62*a*, and 62*b* of the drivers 61 and 62 are denoted by s, t, u, and v. The overall combined output displayed on the liquid crystal panel 60 is denoted by w in FIG. 24.

If the outputs are switched frame by frame (field by field) as in the previous embodiment, then it is possible to reduce the data latches to a half the present size.

In this fifth embodiment, by performing the signal processing in the manner described above with reference to FIG. 24 using the circuit shown in FIG. 23, it is possible to output data well matched with the resolution of the display panel without needing an additional clock generator which is required in conventional techniques. This makes a contribution to a reduction in the size of the circuit and also to a reduction in power consumption. Furthermore, the reliability of the display device is also improved.

It is also possible to display a desired image on the display panel 20 by controlling the sampling timing in the manner as will described below with reference to FIG. 25 using the circuit described in FIG. 11.

The original data is directly sent to both source drivers 21 and 22 via signal lines 29*a* and 29*b*. The source drivers 21 and 22 partly remove the received data by controlling the sampling process on the digital data. The sampling timing is controlled by the horizontal control circuit 30 such that the source drivers 21 and 22 temporarily stop the sampling operation so as to remove some part of the data input to the respective source drivers wherein the part removed from the data is switched field by field. The partly removed data are then supplied directly to the display panel 20.

Figure 25:
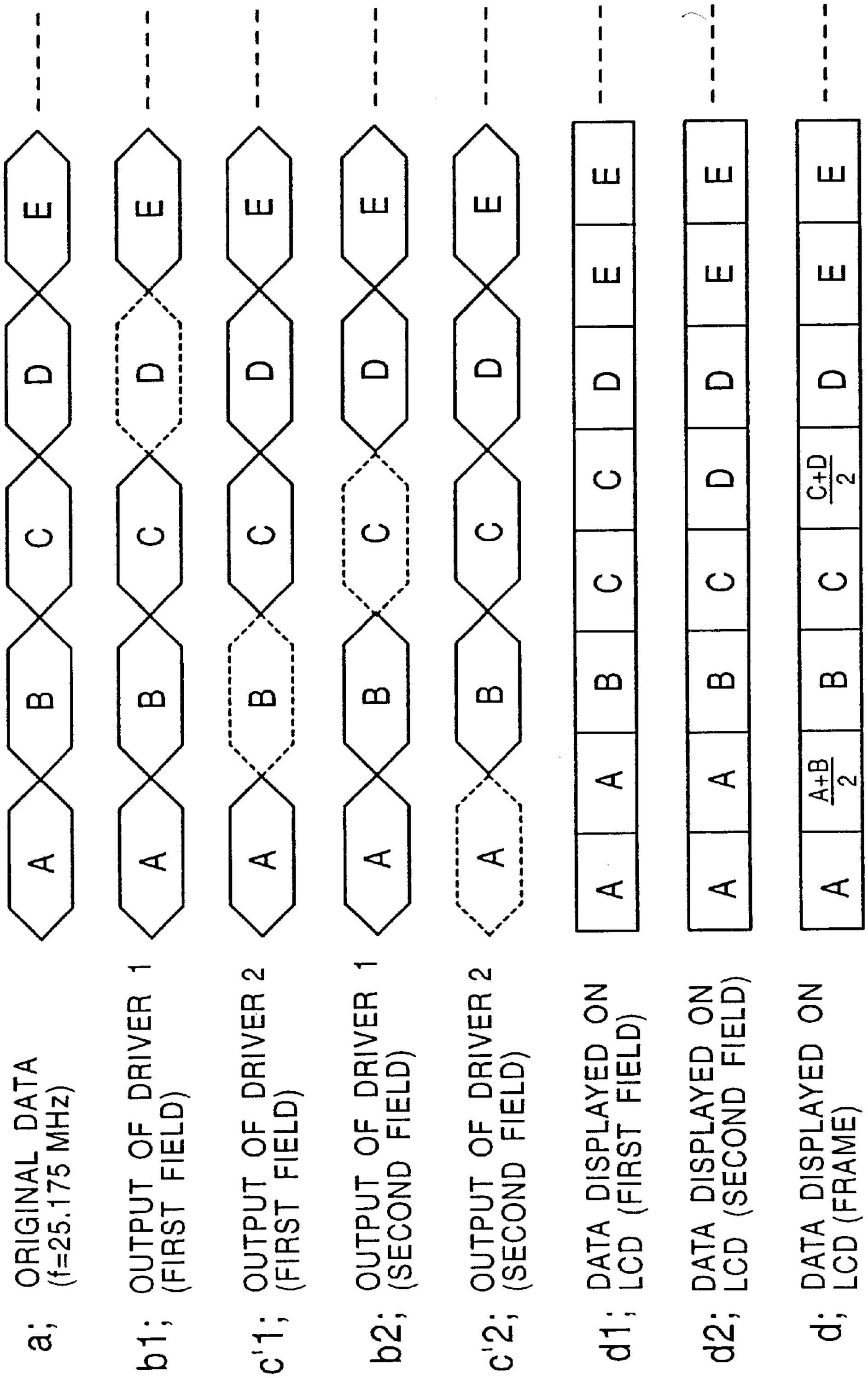
FIG. 25 a circuit diagram illustrating a sixth embodiment of a driver circuit according to the present invention.
Figure 26:
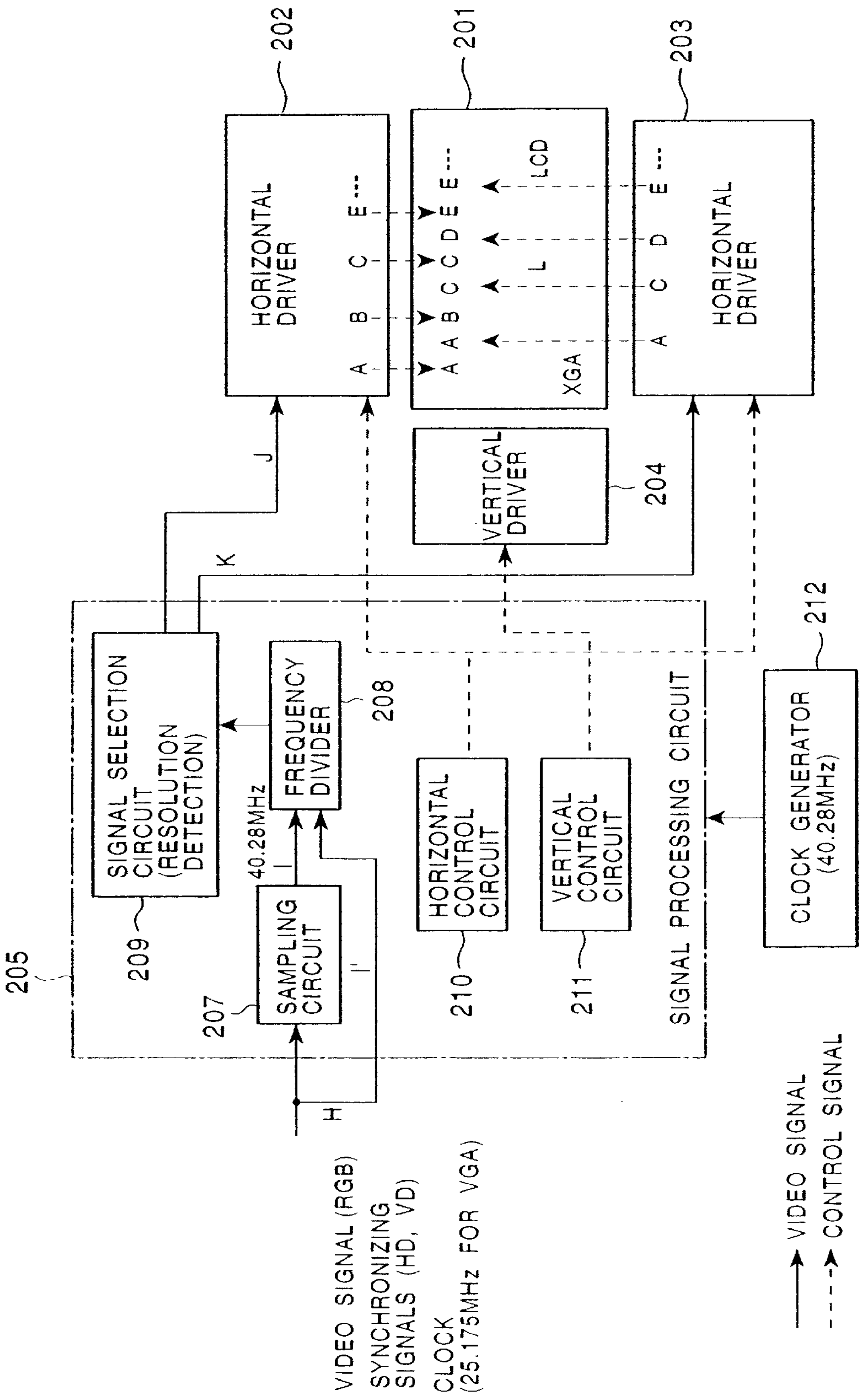
FIG. 26 illustrates a circuit configuration of a display device based on which the present invention has been developed.
Figure 27:
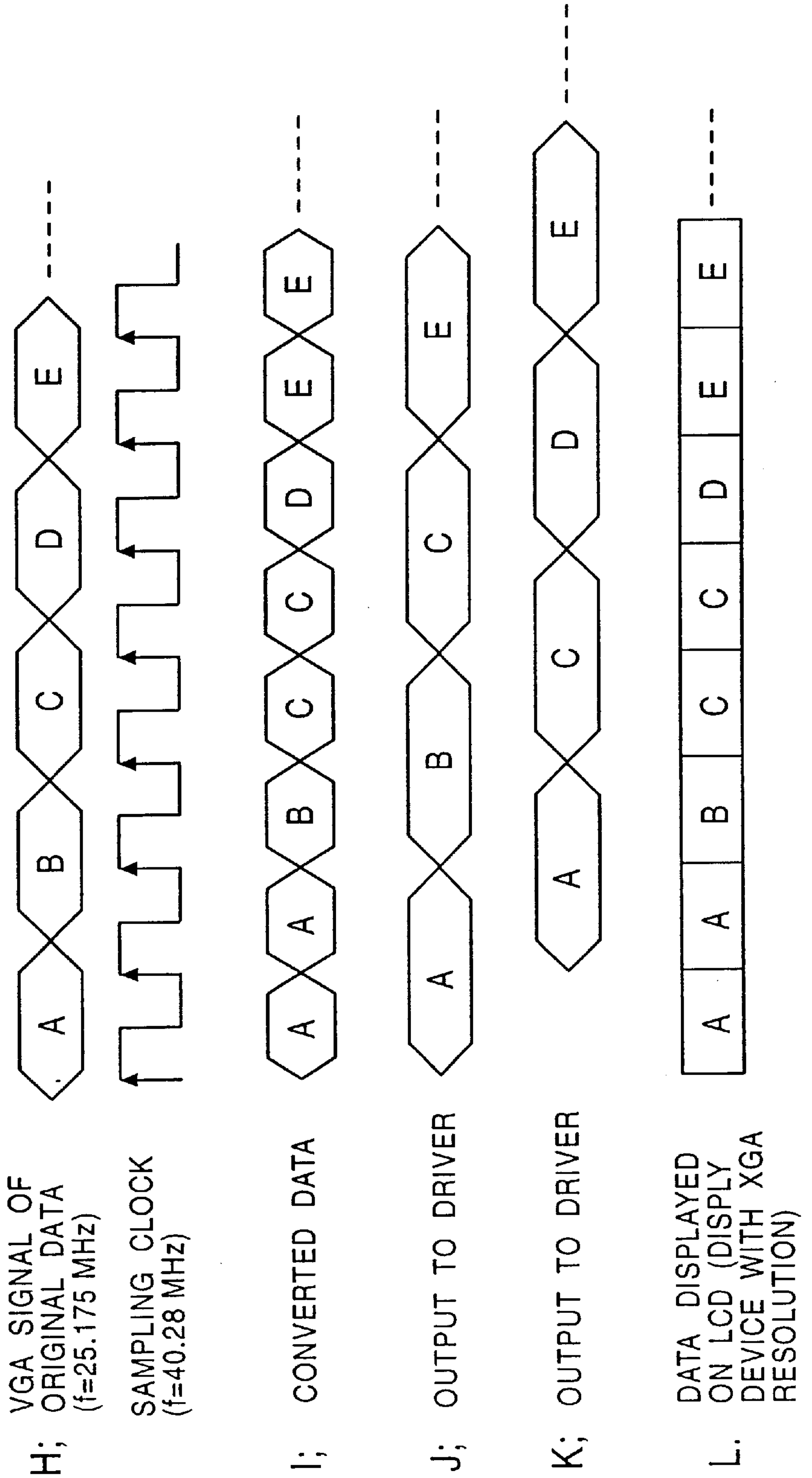
FIG. 27 schematically illustrates signals output at various parts of the driver circuit shown in FIG. 26.

In FIG. 25, the output of the source driver 21 in a first field is denoted by b1, and the output in the second field is denoted by b2. The output of the source driver 22 in the first field is denoted by c'1, and the output in the second field is denoted by c'2. If these outputs are combined together, it is possible to obtain an image d1 in the first field and an image d2 in the second field as shown in FIG. 25. Thus, the overall image d is displayed on the liquid crystal panel 20.

In the above operation, the data which is removed is switched field by field so that an image produced from different two data is displayed in each frame. That is, because the image in each frame is produced by combining the first and second fields, gray scale irregularities are smoothed.

The driving method described herein can also be applied to other embodiments.

In the above embodiments, conversion among the VGA format (640×480 dots), the XGA format (1024×768 dots), and the UXGA format (1600×1200) has been described. However, in addition to these formats, many other formats are also employed in applications of personal computers. Furthermore, in the art of TV and video, many different formate are also used. The driver circuit according to the present invention is applicable to any of these formats.

That is, by adjusting the number signals which are divided or copied and also adjusting the number of signals which are removed depending on the conversion ratio in terms of the number of pixels, it is possible to handle any resolution conversion.

In personal computers, the following resolutions are also widely employed in addition to those described above.

720×400 pixels (VGA text)

832×624 pixels (Macintosh 16 (trademark of Apple Computer Inc.))

800×600 pixels (SVGA)

1152×870 pixels (Macintosh 21 (trademark of Apple Computer Inc.))

In TV applications, the following resolutions (horizontal resolution × vertical resolution) are widely known.

352×240, 352×480, 704×480, 720×480 (NTSC formats according to MPEG2, for DVD)

352×288, 352×576, 704×576, 720×576 (PAL formats according to MPEG2, for DVD)

854×480, 944×512, 640×480, 704×480, 1280×720, 1920×1080 (digital terrestrial television broadcasting standard in USA)

1920×1035 (HDTV standard proposed by NHK)

Conversion ratios are shown in FIGS. 28 and 29 for various resolutions.

As can be seen from FIG. 28 or 29, for example conversion from a 640-pixel image to a 800-pixel image can be accomplished by first increasing the number of pixels of the original data by a factor of 2, that is to 1280 pixels, and then reducing the data by 37.5%, that is to 800 pixels. Conversion from a 800-pixel image to a 1600-pixel image can be accomplished by simply increase the number of pixels by a factor of 2. Conversion from a 640-pixel image to a 1024-pixel image can be accomplished by first increasing the number of original data by a factor of 2 thereby obtaining a 1280-pixel image and then reducing the resultant data by 20% thereby obtaining a 1024-pixel image. As described above, it is possible to easily determine the data removal ratio from the conversion ratio table shown in FIG. 28 or 29.

According to the present invention, as described above in detail, there is provided an image display device capable of displaying an expanded image produced by performing interpolation such that data of an original signal are stored in data storage locations closest to the original locations and data at the locations remaining after storing all original data are each given by either one of two original data at locations adjacent to the respective remaining locations or given as a result of a calculation from two original data at locations adjacent to the respective remaining locations thereby expanding the image without causing a loss of original data during the conversion process and displaying the resultant expanded image on a display panel while maintaining the contrast of the image at the same level as that of the original image.

What is claimed is:

1. An image display, comprising:

a display having pixels aligned in a horizontal and a vertical direction;

an interpolated data generation circuit coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to directly store first image data from a horizontal pixel line of the first image signal into storage locations of a horizontal pixel line of the second image signal;

the storage locations of the horizontal pixel line of the second image signal closely corresponding to the storage locations of the horizontal pixel line of the first image signal;

the interpolated data generation circuit being further configured to derive each remaining image data of the second image signal from selected combinations of first image data; and the interpolated data generation circuit being further configured to store each remaining image data adjacent to each of the selected first image data that derived the respective remaining image data.

2. An image display, comprising:

a display having pixels aligned in a horizontal and a vertical direction;

an interpolated data generation circuit coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to store first image data from a first and a second horizontal pixel line of the first image signal directly into storage locations of the second image signal that closely correspond to storage locations of the first and the second horizontal pixel lines of the first image signal;

the interpolated data generation circuit being further configured to derive each remaining image data of the second image signal from selected first image data by copying image data from selected first image data stored adjacent to remaining storage locations of the second image signal; and the interpolated data generation circuit being further configured to store the remaining image data of the second image signal into the remaining storage locations of the second image signal such that adjacent remaining storage locations of the second image signal retain different image data.

3. An image display, comprising:

a display having pixels capable of displaying image frames;

an interpolated data generation circuit coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to store first image data from a first and a second horizontal pixel line of the first image signal directly into storage locations of the second image signal that closely correspond to storage locations of the first and the second horizontal pixel lines of the first image signal; and the interpolated data generation circuit being further configured to derive each remaining image data of the second image signal from selected first image data by copying image data from selected first image data stored adjacent to remaining storage locations of the second image signal such that each of the adjacent remaining storage locations of the second image signal retain different image data.

4. An image display, comprising:

a display having pixels;

an interpolated data generation circuit coupled to the display and a first image signal, the interpolated data generation circuit being configured to generate a second image signal to be displayed on the display when a vertical resolution of the display is greater than a number of pixels in a vertical direction of the first image signal;

the interpolated data generation circuit being further configured to directly store first image data from a vertical pixel line of the first image signal into storage locations of a vertical pixel line of the second image signal;

the storage locations of the vertical pixel line of the second image signal closely corresponding to the storage locations of the vertical pixel line of the first image signal;

the interpolated data generation circuit being further configured to derive each remaining image data of the second image signal from selected combinations of first image data; and the interpolated data generation circuit being further configured to store each remaining image data adjacent to each of the first image data that derived the respective remaining image data.

5. An image display, comprising:

a display having pixels;

an interpolated data generation circuit coupled to the display and a first image signal, the interpolated data generation circuit being configured to generate a second image signal to be displayed on the display when a vertical resolution of the display is greater than a number of pixels in a vertical direction of the first image signal;

the interpolated data generation circuit being further configured to store first image data from a first and a second vertical pixel line of the first image signal directly into storage locations of the second image signal that closely correspond to storage locations of the first and the second vertical pixel lines of the first image signal;

the interpolated data generation circuit being further configured to derive each remaining image data of the second image signal from selected first image data by copying image data from selected first image data stored adjacent to remaining storage locations of the second image signal; and the interpolated data generation circuit being further configured to store the remaining image data of the second image signal into the remaining storage locations of the second image signal such that adjacent remaining storage locations of the second image signal retain different image data.

6. An image display, comprising:

a display having pixels capable of displaying image frames;

an interpolated data generation circuit coupled to the display and a first image signal, the interpolated data generation circuit being configured to generate a second image signal to be displayed on the display when a vertical resolution of the display is greater than a number of pixels in a vertical direction of the first image signal;

the interpolated data generation circuit being further configured to store first image data from a first and a second vertical pixel line of the first image signal directly into storage locations of the second image signal that closely correspond to storage locations of the first and the second vertical pixel lines of the first image signal; and the interpolated data generation circuit being further configured to derive each remaining image data of the second image signal from selected first image data by copying image data from selected first image data stored adjacent to remaining storage locations of the second image signal such that each of the adjacent remaining storage locations of the second image signal retain different image data.

7. An image display device, comprising:

a display having pixels;

a pair of source drivers coupled to the display; each source driver configured to drive a smaller number of pixels in a vertical direction than a vertical resolution of the display;

a pair of image signal lines configured to transmit two identical second image signals to the pair of source drivers; and a vertical control circuit coupled to the pair of source drivers, the vertical control circuit configured to add and remove data received by the pair of source drivers such that a combined number of pixels driven by the pair of source drivers matches the vertical resolution of the display.

8. An image display device, of claim 7 wherein each pixel comprises a switching element coupled to a pixel electrode.

9. An image display device, comprising:

a display comprising an array of switching elements;

a pair of source drivers coupled to the display; each source driver configured to drive a smaller number of switching elements in a vertical direction than a vertical resolution of the display;

an image signal line configured to transmit an image signal to the pair of source drivers; and a vertical control circuit coupled to the pair of source drivers, the vertical control circuit configured to generate a pair of sampling signals received by the pair of source drivers;

wherein the pair of source drivers are further configured to sequentially generate vertical image signals that drive the vertical resolution of the display.

10. An image display, comprising:

a display having an array of switching elements;

a source driver coupled to the display; the source driver configured to generate a vertical image signal that drive a vertical resolution of the display;

an image signal line configured to convey an image signal to the source driver;

a vertical control circuit coupled to the source driver, the vertical control circuit configured to sequentially generate a plurality of sampling signals; and the source driver being further configured to generate a vertical image signal capable of driving fewer switching elements than the image signal;

wherein the source driver selectively removes data from the image signal on a frame-by frame basis.

11. An image display, comprising:

a display having an array of switching elements;

a source driver coupled to the display; the source driver configured to generate a vertical image signal that drive a vertical resolution of the display;

an image signal line configured to convey an image signal to the source driver;

a vertical control circuit coupled to the source driver, the vertical control circuit configured to sequentially generate a plurality of sampling signals; and the source driver being further configured to generate a vertical image signal capable of driving fewer switching elements than the image signal;

wherein the source driver selectively removes data from the image signal on a frame-by frame basis;

wherein the source driver selectively removes data from the image signal on a line-by line basis.

12. An image display, comprising:

a display having an array of switching elements;

a source driver coupled to the display; the source driver configured to generate a vertical image signal that drive a vertical resolution of the display;

an image signal line configured to convey an image signal to the source driver;

a vertical control circuit coupled to the source driver, the vertical control circuit configured to sequentially generate a plurality of sampling signals; and the source driver being further configured to generate a vertical image signal capable of driving fewer switching elements than the image signal;

wherein the source driver selectively removes data from the image signal on a frame-by frame basis;

wherein the source driver selectively removes data from the image signal on a timed basis.

13. An image display, comprising:

a display having pixels aligned in a horizontal and a vertical direction;

an interpolated data generation circuit coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to store first image data from a horizontal pixel line of the first image signal directly into storage locations that closely correspond to storage locations of the first image signal; and the interpolated data generation circuit being further configured to derive each remaining image data from select combinations of first image data stored adjacent to each storage locations of the remaining image data.

14. A drive circuit for an image display, comprising:

a source driver connected to a display panel on which a predetermined number of horizontal pixels and a predetermined number of vertical pixels are alternately disposed so as to output a horizontal video signal to the display panel; and a signal processing circuit disposed at a stage prior to the source driver, for transmitting to the source driver a pair of video signals obtained from an original video signal whose number of horizontal pixels is different from the predetermined number of horizontal pixels, and for supplying a sampling timing signal to the source driver so that a horizontal video signal having the predetermined number horizontal pixels is obtained when the horizontal video signal output from the source driver is combined.

15. A drive circuit according to claim 14, wherein the signal processing circuit comprises a horizontal video signal control circuit for adjusting the sampling timing signal in accordance with a horizontal-direction pixel-number conversion ratio obtained by the number of horizontal pixels of the original video signal and the predetermined number horizontal pixels of the display panel.

16. A drive circuit according to claim 14, wherein the source driver has a number of output lines smaller than the predetermined number of horizontal pixels, and the timing at which each of the output lines outputs the horizontal video signal corresponding to a plurality of rows of the horizontal pixels is different from the other output lines.

17. A drive circuit according to claim 15, wherein the display panel comprises a plurality of source wirings and a plurality of gate wirings disposed in a matrix on a substrate, and a pixel electrode disposed at each intersection of the source wiring and the gate wiring via a switching device, and each of the output lines of the source driver is connected to one of the source wirings.

18. A drive circuit according to claim 14, wherein the source driver reduces data at a predetermined ratio from the video signal, which is input into the source driver at predetermined intervals, so as to output the resulting data as the horizontal video signal, and the source driver changes a position at which the data is to be reduced from the video signal to one of each field, each line, and each frame.

19. An image display, comprising:

a display having pixels aligned in a horizontal and a vertical direction;

a frame memory for storing original image data;

a line memory connected to the frame memory, for storing data for one horizontal pixel line;

an interpolated data generation circuit for calculating data based on image data from the frame memory and image data from the line memory, the interpolated data generation circuit being coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to directly store first image data from a horizontal pixel line of the first image signal into storage locations of a horizontal pixel line of the second image signal;

the storage locations of the horizontal pixel line of the second image signal closely corresponding to the storage locations of the horizontal pixel line of the first image signal;

the interpolated data generation circuit being further configured to derive each remaining image data of the second image signal from selected combinations of first image data; and the interpolated data generation circuit being further configured to store each remaining image data adjacent to each of selected first image data that derived the respective remaining image data, wherein an expanded image is displayed on the display while maintaining contrast of an original image without impairing individual data of the original image data when data interpolation is performed.

20. An image display, comprising:

a display having pixels aligned in a horizontal and a vertical direction;

a frame memory for storing original image data;

a line memory connected to the frame memory, for storing data for one horizontal pixel line;

an interpolated data generation circuit for calculating data based on image data from the frame memory and image data from the line memory, the interpolated data generation circuit being coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to store first image data from a first and a second horizontal pixel line of the first image signal directly into storage locations of the second image signal that closely correspond to storage locations of the first and the second horizontal pixel lines of the first image signal;

the interpolated data generation circuit being further configured to derive each remaining image data of the second image signal from selected first image data by copying image data from selected first image data stored adjacent to remaining storage locations of the second image signal; and the interpolated data generation circuit being further configured to store the remaining image data of the second image signal into the remaining storage locations of the second image signal such that adjacent remaining storage locations of the second image signal retain different image data, wherein an expanded image is displayed on the display while maintaining contrast of an original image without impairing individual data of the original image data when data interpolation is performed.

21. An image display, comprising:

a display having pixels capable of displaying image frames;

a frame memory for storing original image data;

a line memory connected to the frame memory, for storing data for one horizontal pixel line;

an interpolated data generation circuit for calculating data based on image data from the frame memory and image data from the line memory, the interpolated data generation circuit being coupled to the display and a first image signal, the interpolated data generation circuit being configured to generate a second image signal to be displayed on the display when a vertical resolution of the display is greater than a number of pixels in a vertical direction of the first image signal;

the interpolated data generation circuit being further configured to store first image data from a first and a second vertical pixel line of the first image signal directly into storage locations of the second image signal that closely correspond to storage locations of the first and the second vertical pixel lines of the first image signal; and the interpolated data generation circuit being further configured to derive each remaining image data of the second image signal from selected first image data by copying image data from selected first image data stored adjacent to remaining storage locations of the second image signal such that each of the adjacent remaining storage locations of the second image signal retain different image data, wherein an expanded image is displayed on the display while maintaining contrast of an original image without impairing individual data of the original image data when data interpolation is performed.

22. An image display, comprising:

a display having pixels aligned in a horizontal and a vertical direction;

a frame memory for storing original image data;

a line memory connected to the frame memory, for storing data for one horizontal pixel line;

an interpolated data generation circuit for calculating data based on image data from the frame memory and image data from the line memory, the interpolated data generation circuit being coupled to the display and a first image signal, the interpolated data generation circuit being configured to generate a second image signal to be displayed on the display when a horizontal resolution of the display is greater than a number of pixels in a horizontal direction of the first image signal;

the interpolated data generation circuit being further configured to store first image data from a horizontal pixel line of the first image signal directly into storage locations that closely correspond to storage locations of the first image signal; and the interpolated data generation circuit being further configured to derive each remaining image data from select combinations of first image data stored adjacent to each storage locations of the remaining image data, wherein an expanded image is displayed on the display while maintaining contrast of an original image without impairing individual data of the original image data when data interpolation is performed.

* * * * *

UNITED STATES PATENT AND TRADEMARK OFFICE

CERTIFICATE OF CORRECTION

PATENT NO. : 6,593,939 B2
DATED : July 15, 2003
INVENTOR(S) : Yukimitsu Yamada et al.

It is certified that error appears in the above-identified patent and that said Letters Patent is hereby corrected as shown below:

Title page,
After Item [22] Filed:, insert a new item:
-- [30] Foreign Application Priority Data
Apr. 7, 1998 (JP) 10-095041
Jul. 6, 1998 (JP) 10-190838 --.
Item [56], References Cited, FOREIGN PATENT DOCUMENTS, delete "1998-308591" and substitute -- 10-112830 -- in its place; and delete "411133880 A" and substitute -- 11-133880 -- in its place.

Signed and Sealed this

Twentieth Day of April, 2004

JON W. DUDAS
*Acting Director of the United States Patent and Trademark Office*